(12) United States Patent
Levi et al.

(10) Patent No.: US 10,572,619 B2
(45) Date of Patent: Feb. 25, 2020

(54) PSEUDO-ASYNCHRONOUS DIGITAL CIRCUIT DESIGN

(71) Applicant: Bar-Ilan University, Ramat-Gan (IL)

(72) Inventors: Itamar Levi, Lehavim (IL); Osnat Keren, Rosh HaAyin (IL); Alexander Fish, Tel-Mond (IL)

(73) Assignee: Bar-Ilan University, Ramat-Gan (IL)

( * ) Notice: Subject to any disclaimer, the term of this patent is extended or adjusted under 35 U.S.C. 154(b) by 0 days.

(21) Appl. No.: 16/312,317

(22) PCT Filed: Jun. 29, 2017

(86) PCT No.: PCT/IL2017/050727
§ 371 (c)(1),
(2) Date: Dec. 21, 2018

(87) PCT Pub. No.: WO2018/002934
PCT Pub. Date: Jan. 4, 2018

(65) Prior Publication Data
US 2019/0220554 A1 Jul. 18, 2019

Related U.S. Application Data

(60) Provisional application No. 62/355,891, filed on Jun. 29, 2016.

(51) Int. Cl.
*G06F 17/50* (2006.01)
*G06F 21/55* (2013.01)
(Continued)

(52) U.S. Cl.
CPC .......... *G06F 17/505* (2013.01); *G06F 21/556* (2013.01); *G06F 21/75* (2013.01);
(Continued)

(58) Field of Classification Search
None
See application file for complete search history.

(56) References Cited

U.S. PATENT DOCUMENTS 6,545,507 B1 * 4/2003 Goller ................... H04L 7/0338
326/9
7,127,620 B2 10/2006 Boeckeler
(Continued)

FOREIGN PATENT DOCUMENTS

DE 102014009808 1/2016
EP 1924023 5/2008
(Continued)

OTHER PUBLICATIONS

International Preliminary Report on Patentability dated Jan. 10, 2018 From the International Bureau of WIPO Re. Application No. PCT/IL2017/050727. (5 Pages).
(Continued)

*Primary Examiner* — Minh D A
*Assistant Examiner* — James H Cho

(57) ABSTRACT

A logic element includes a logic block, a clock generator, a clock assigner and at least one sampling element. The logic block implements a logic function on input data to obtain a plurality output data signals. The output data signals are sampled by respective clock signals. The clock generator generates phase-shifted clock signals from a reference clock signal. The clock assigner assigns differing ones of the phase-shifted clock signals to respective output data signals. The sampling element(s) sample the output data signals in accordance with the respective assigned phase-shifted clock signals.

18 Claims, 29 Drawing Sheets

(51) Int. Cl.
  *H04L 9/00* (2006.01)
  *H04L 9/12* (2006.01)
  *H03K 19/00* (2006.01)
  *G06F 21/75* (2013.01)
  *H03K 19/003* (2006.01)

(52) U.S. Cl.
  CPC ....... *G06F 21/755* (2017.08); *H03K 19/0013* (2013.01); *H03K 19/00315* (2013.01); *H04L 9/003* (2013.01); *H04L 9/12* (2013.01); *G06F 2217/78* (2013.01); *G06F 2221/034* (2013.01)

(56) References Cited

U.S. PATENT DOCUMENTS

| | | | |
|---|---|---|---|
| 7,492,849 B2* | 2/2009 | On | H03D 13/004 327/158 |
| 7,590,880 B1 | 9/2009 | Hershman | |
| 7,660,364 B2* | 2/2010 | Sandner | H04L 25/0288 327/233 |
| 7,694,242 B1 | 4/2010 | Li et al. | |
| 7,907,722 B2 | 3/2011 | Timmermans | |
| 8,296,704 B1 | 10/2012 | Kipprer et al. | |
| 9,209,960 B1* | 12/2015 | Leung | H04L 7/002 |
| 2002/0131596 A1 | 9/2002 | Boeckeler | |
| 2003/0197529 A1* | 10/2003 | Campbell | G01R 31/31855 326/93 |
| 2011/0285420 A1 | 11/2011 | Deas et al. | |
| 2012/0200313 A1 | 8/2012 | Kyue et al. | |
| 2014/0259161 A1 | 9/2014 | Kastner et al. | |
| 2018/0032655 A1 | 2/2018 | Levi et al. | |

FOREIGN PATENT DOCUMENTS

| | | |
|---|---|---|
| EP | 1926241 | 5/2008 |
| WO | WO 2018/002934 | 1/2018 |
| WO | WO 2018/002939 | 1/2018 |
| WO | WO 2019/167050 | 9/2019 |

OTHER PUBLICATIONS

International Preliminary Report on Patentability dated Jan. 10, 2019 From the International Bureau of WIPO Re. Application No. PCT/IL2017/050732. (5 Pages).
International Search Report and the Written Opinion dated Oct. 16, 2017 From the International Searching Authority Re. Application No. PCT/IL2017/050727. (11 Pages).
International Search Report and the Written Opinion dated Sep. 25, 2017 From the International Searching Authority Re. Application No. PCT/IL2017/050732. (9 Pages).
Alioto et al. "A General Power Model of Differential Power Analysis Attacks to Static Logic Circuits", IEEE Transactions on Very Large Scale Integration (VLSI) Systems, 18(5): 711-724, Published Online Apr. 23, 2010.
Alioto et al. "Effectiveness of Leakage Power Analysis Attacks on DPA-Resistant Logic Styles Under Process Variations", IEEE Transactions on Circuits and Systems I: Regualr Papers, 61(2): 429-442, Published Online Jan. 24, 2014.
Alioto et al. "Leakage Power Analysis Attacks Against a Bit Slice Implementation of the Serpent Block Cipher", 2014 Proceedings of the 21st International Conference on Mixed Design of Integrated Circuits and Systems, MIXDES 2014, Lublin, Poland, Jun. 19-21, 2014, p. 241-246, Jun. 19, 2014.
Alioto et al. "Leakage Power Analysis Attacks: A Novel Class of Attacks to Nanometer Cryptographic Circuits", IEEE Transactions on Circuits I: Regular Papers, 57(2): 355-367, Published Online Feb. 10, 2010.
Alioto et al. "Leakage Power Analysis Attacks: Well-Defined Procedure and First Experimental Results", 2009 International Conference on Microelectronics, ICM, Marrakech, Marocco, Dec. 19-22, 2009, p. 46-49, Dec. 19, 2009.
Arunachalam et al. "False Coupling Interactions in Static Timing Analysis", Proceedings of the 38th Annual Design Automation Conference, DAC 2001, Las Vegas, Nevada, USA, Jun. 18-22, 2001, p. 726-731, Jun. 18, 2001.
Avital et al. "Randomized Multitopology Logic Against Differential Power Analysis", IEEE Transactions on Very Large Scale Integration (VLSI) Systems, 23(4): 702-711, Jun. 4, 2014.
Baddam et al. "Divided Backened Duplication Methodology for Balanced Dual Rail Routing", Proceedings of the 10th International Workshop on Cryptographic Hardware and Embedded Systems, CHES 2008, Washington, DC, USA, Aug. 10-13, 2008, p. 396-410, Aug. 10, 2008.
Balasch et al. "On the Cost of Lazy Engineering for Masked Software Implementations", 13th International Conference on Smart Card Research and Advanced Applications, CARDIS 2014, Paris, France, Nov. 5-7, 2014, LNCS 8968: 64-81, Nov. 5, 2014.
Batina et al. "Public-Key Cryptography for RFID-Tags", 5th Annual IEEE International Conference on Pervasive Computing and Communications Workshop, PerComW'07, White Plains, NY, USA, Mar. 19-23, 2007, p. 217-222, Mar. 19, 2007.
Becker et al. "Test Vector Leakage Assessment (TVLA) Methodology in Practice", International Cryptographic Module Conference, 1001: 1-13, 2013.
Bilgin et al. "A More Efficient AES Threshold Implementation", Proceedings of the 7th International Conference on Cryptology in Africa, AFRICACRYPT 2014, Marrakesh, Morocco, May 28-30, 2014, 8469: 267-284, May 28, 2014.
Bilgin et al. "Higher Order Threshold Implementations", International Conference on the Theory and Application of Cryptology and Information Security, Advances in Cryptology, ASIACRYPT 2014, p. 326-43, Dec. 7, 2014.
Brier et al. "Correlation Power Analysis With a Leakage Model", International Workshop on Cryptographic Hardware and Embedded Systems—CHES 2004, p. 16-29, Aug. 11, 2004.
Bucci et al. "A Countermeasure Against Differential Power Analysis Based on Random Delay Insertion", IEEE International Symposium on Circuits and Systems, ISCAS 2005, Kobe, Japan, May 23-26, 2005, 4: 3547-3550, May 23, 2005.
Bucci et al. "A Flip-Flop for the DPA Resistant Three-Phase Dual-Rail Pre-Charge Logic Family", IEEE Transactions on Very Large Scale Integration (VLSI) Systems, 20(11): 2128-2132, Published Online Oct. 6, 2011.
Bucci et al. "Delay-Based Dual-Rail Precharge Logic", IEEE Transactions on Very Large Scale Integration (VLSI) Systems, 19(7): 1147-1153, Published Online Jun. 24, 2011.
Bucci et al. "Three-Phase Dual-Rail Pre-Charge Logic", Proceedings of the 8th International Conference on Cryptographic Hardware and Embedded Systems, CHES 2006, Yokohama, Japan, Oct. 10-13, 2006, p. 232-234, Oct. 10, 2006.
Cao et al. "Mapping Statistical Process Variations Toward Circuit Performances Variability: An Analytical Modeling Approach", IEEE Transactions on Computer-aided Design of Integrated Circuits and Systems, 26(10): 1866-1873, Oct. 2007.
Cevrero et al. "Power-Gated Mos Current Mode Logic (Pg-Mcml): a Power Aware Dpa-Resistant Standard Cell Library", Proceedings of the 48th Acm/Edac/IEEE Design Automation Conference, Dac 2011, San Diego, Ca, Usa, 05-10 Jun. 2011, Chap.53.6: 1014-1019, 05 Jun. 2011.
Chabaud et al. "Links Between Differential and Linear Cryptoanalysis", Workshop on the Theory and Application of Cryptographic Techniques, Advances in Cryptology, Eurocryp'94, 950(Lasec-Conf-1995-001): 356-365, Published Online 09 May 1994.
Chapiro "Globally-Asynchronous Locally-Synchronous Systems", a Dissertation Submitted to the Department of Computer Science and the Committee on Graduate Studies of Stanford University in Partial Fulfillment of the Requirements for the Degree of Doctor of Philosophy, Stanford University, Stanford, Ca, Usa, P.1-123, Oct. 1984.
Chen et al. "Power Supply Noise Analysis Methodology for Deep-Submicron Vlsi Chip Design", Proceedings of the 34th Annual Design Automation Conference, Dac'97, Anaheim, Ca, Usa, 09-13 Jun. 1997, 40.3: 638-643, 09 Jun. 1997.

(56) References Cited

OTHER PUBLICATIONS

Clavier et al. "Differential Power Analysis in the Presence of Hardware Countermeasures", Proceedings of the 2nd International Workshop on Cryptographic Hardware and Embedded Systems, Ches 2000, Worcester, Ma, Usa, 17-18 Aug. 2000, P.252-263, 17 Aug. 2000.
Daemen "The Design of Rijndael: Aes - the Advanced Encryption Standard", Springer Science & Bussiness Media, P.1-238, 26 Nov. 2001.
Das et al. "High Efficiency Power Side-Channel Attack Immunity Using Noise Injection in Attenuated Signature Domain", 2017 IEEE International Symposium on Hardware Oriented Security and Trust, HOST, McLean, VA, USA, May 1-5, 2017, p. 62-67, May 1, 2017.
De Mulder et al. "Practical DPA Attacks on MDPL", First IEEE International Workshop on Information Forensics and Security, WIFS 2009, London, UK, Dec. 6-9, 2009, p. 191-195, Dec. 6, 2009.
Del Pozo et al. "Side-Channel Attacks From Static Power: When Should We Care?", Proceedings of the 2015 Design, Automation & Test in Europe Conference & Exhibition, Date'15, Grenoble, France, Mar. 9-13, 2015, p. 145-150, Mar. 9, 2015.
Du et al. "Multi-Core Architecture With Asynchronous Clocks to Prevent Power Analysis Attacks", IEICE Electronics Express, 14(4):20161220-1-20161220-10, Published Online Feb. 9, 2017. Abstract, Sections 1, 2.
Evans "Embedded Incomplete Latin Squares", The American Mathematical Monthly, 67(10): 958-961, Dec. 1960.
Gao et al. "Analog Circuit Shielding Routing Algorithm Based on Net Classification", Proceedings of the 16th ACM/IEEE International Symposium on Low Power Electronics and Design, ISPLED'10, Austin, Texas, USA, Aug. 18-20, 2010, p. 123-128, Aug. 18, 2010.
Gierlichs et al. "Revisiting Higher-Order DPA Attacks: Multivariate Mutual Information Analysis", Proceedings of the 2010 International Conference on Topics in Cryptology, CT-RSA 2010, San Francisco, CA, USA, Mar. 1-5, 2010, p.221-234, Mar. 1, 2010.
Gierlichs et al. "Statistical and Information-Theoretic Methods for Power Analysis on Embedded Cryptography", Dissertation Presented in Partial Fulfillment of the Requirements for the Degree of Doctor in Engineering, Katholieke Universiteit Leuven, Gelgium, Arenberg Doctoral School of Science, Engineering & Technology, Faculty of Engineering, Department of Electrical Engineering, ESAT, p. 1-161, Jan. 2011.
Goodwill et al. "A Testing Metogology for Side-Channel Resistance Validation", NIST Non-Invasive Attack Testing Workshop, p. 1-15, 2011.
Gornik et al. "A Hardware-Based Countermeasure to Reduce Side-Channel Leakage: Design, Implementation, and Evaluation", IEEE Transactions on Computer-Aided Design on Integrated Circuits and Systems, 34(8): 1308-1319, Published Online Apr. 16, 2015.
Güneysu et al. "Generic Side-Channel Countermeasures for Reconfigurable Devices", Proceedings of the 13th International Workshop on Cryptographic Hardware and Embedded Systems, CHES'11, Nara, Japan, Sep. 28-Oct. 1, 2011, p. 33-48, Sep. 28, 2011.
Gürkaynak et al. "Improving DPA Security by Using Globally-Asynchronous Locally-Synchronous Systems", Proceedings of the 31st European Solid-State Circuits Conference, ESSCIRC 2005, Grenoble, France, Sep. 12-16, 2005, p. 407-410, Sep. 12, 2005.
Heydari et al. "Capacitive Coupling Noise in High-Speed VLSI Circuits", IEEE Transactions on Computer-Aided Design of Integrated Circuits and Systems, 24(3): 478-488, Mar. 2005.
Huffman "The Design and Use of Hazard-Free Switching Networks", Journal of the ACM, JACM, 4(1): 47-62, Jan. 1957.
Hwang et al. "AES-Based Security Coprocessor IC in 0.18-?m CMOS With Resistance to Differential Power Analysis Side-Channel Attacks", IEEE Journal of Solid-state Circuits, 41(4): 781-792, Apr. 2006.
Joye et al. "On Second-Order Differential Power Analysis", Proceedings of the 7th International Conference on Cryptographic Hardware and Embedded Systems, CHES 2005, Edinburgh, UK, Aug. 29-Sep. 1, 2005, LNCS 3659: 293-308, Aug. 29, 2005.

Kamoun et al. "Experimental Implementation of 2ODPA Attacks on AES Design With Flash-Based FPGA Technology", 22nd IEEE International Conference on Microelectronics, IMC 2010, Cairo, Egypt, Dec. 19, 2010, p. 407-410, Dec. 19, 2010.
Kocher et al. "Differential Power Analysis", Proceedings of the 19th Annual International Cryptology Conference on Advances in Cryptology, CRYPTO'99, Aug. 15-19, 1999, p. 388-397, Aug. 15-19, 1999.
Kocher et al. "Introduction to Differential Power Analysis", Journal of Cryptographic Engineering, 1(1): 5-27, Published Online Mar. 3, 2011.
Krstic et al. "System Integration by Request-Driven GALS Design", IEE Proceedings—Computers and Digital Techniques, 153(5): 362-372, Sep. 2006.
Levi et al. "Data-Dependent Delays as a Barrier Against Power Attacks", IEEE Transactions on Circuits and Systems I: Regular Papers, 62(8): 2069-2078, Published Online Jul. 24, 2015. Sections I, II.
Loder et al. "Towards a Framework to Perform DPA Attack on GALS Pipeline Architectures", Proceedings of the 27th Symposium on Integrated Circuits and Systems Design, SBCCI'14, Aracaju, Brazil, Sep. 1-5, 2014, Art.33: 1-7, Sep. 1, 2014.
Mace et al. "A Dynamic Current Mode Logic to Counteract Power Analysis Attacks", Proceedings of the 19th International Conference on Design of Circuits and Integrated Systems, DCIS 2004, Bordeaux, France, p. 186-191, Nov. 24, 2004.
Mangard et al. "Hardware Countermeasures Against DPA—A Statistical Analysis of Their Effectiveness", Topics in Cryptology—CT-RSA 2004, Proceedings of the Cryptographers' Track at the RSA Conference 2004, San Francisco, CA, USA, Feb. 2004, LNCS 2964: 222-235, Feb. 2004.
Mangard et al. "One for All—All for One: Unifying Standard DPA Attacks", IET Information Security, 5(2): 100-111, 2011.
Mangard et al. "Side-Channel Leakage of Masked CMOS Gates", Proceedings of the 2005 International Conference on Topics in Cryptology—CT-RSA 2005, San Francisco, CA, USA, Feb. 14-18, 2005, 3376: 351-365, Feb. 14, 2005.
Mangard et al. "Successfully Attacking Masked AES Hardware Implementations", Proceedings of the 7th International Conference on Cryptographic Hardware and Embedded Systems, CHES 2005, Edingburgh, UK, Aug. 29-Sep. 1, 2005, p. 157-171, Aug. 29, 2005.
Mayhew "Design of an On-Chip Power Analysis Attack Countermeasure Incorporating a Randomized Switch Box", A Thesis Presented in Partial Fulfilment of Requirements for the Degree of Doctor of Philosophy in Engineering, University of Guelph, Ontario, Canada, p. 1-242, Apr. 2016.
Messerges "Using Second-Order Power Analysis to Attack DPA Resistant Software", Proceedings of the 2nd International Workshop on Cryptographic Hardware and Embedded Systems, CHES 2000, Worcester, MA, USA, Aug. 17-18, 2000, LNCS 1965: 238-251, Aug. 17, 2000.
Messerges et al. "Examining Smart-Card Scurity Under the Threat of Power Analysis Attacks", IEEE Transactions on Computers, 51(5): 541-552, May 2002.
Moore et al. "Balanced Self-Checking Asynchronous Logic for Smart Card Applications", Microprocessors and Microsystems, 27(9): 421-430, Oct. 31, 2003.
Moradi et al. "Information Leakage of Flip-Flops in DPA-Resistant Logic Styles", IACR Cryptology ePrint Archive, 2008: 188-1-188-13, 2008.
Moradi et al. "Pushing the Limits: A Very Compact and a Threshold Implementation of AES", Annual International Conference on the Theory and Applications of Cryotpgraphic Techniques, LNCS, 6632: 69-88, May 2011.
Muttersbach et al. "Practical Design of Globally-Asynchronous Locally-Synchronous Systems", Proceedings of the 6th International Symposium on Advanced Research in Asynchronous Circuits and Systems, ASYNC 2000, Eilat, Israel, Apr. 2-6, 2000, p. 52-59, Apr. 2, 2000.
Naccache et al. "Cryptographic Smart Cards", IEEE Micro, 16(3): 14, 16-24, Jun. 1996.
Oswald et al. "Practical Second-Order DPA Attacks for Masked Smart Card Implementations of Block Ciphers", Proceedings of the 2006 the Cryptographers' Track at the RSA Conference on Topics

(56) References Cited

OTHER PUBLICATIONS in Cryptology, CT-RSA 2006, San Jose, CA, USA, Feb. 13-17, 2006, p. 192-207, Feb. 13, 2006.
Peeters et al. "Improved Higher-Order Side-Channel Attacks With FPGA Experiments", Proceedings of the 7th International Conference on Cryptographic Hardware and Embedded System, CHES 2005, Edinburgh, UK, Aug. 29-Sep. 1, 2005, p. 309-323, Aug. 29, 2005.
Popp et al. "Evaluation of the Masked Logic Style MDPL on a Prototype Chip", Proceedings of the 9th International Workshop on Cryptographic Hardware and Embedded Systems, CHES'07, Vienna, Austria, Sep. 10-13, 2007, p. 81-94, Sep. 10, 2007.
Popp et al. "Implementation Aspects of the DPA-Resistant Logic Style MDPL", Proceedings of the 2006 IEEE International Symposium on Circuits and Systems, ISCAS 2006, Island of Kos, Greece, May 21-24, 2006, p. 2913-2916, May 21, 2006.
Ratanpal et al. "An On-Chip Signal Suppression Countermeasure to Power Analysis Attacks", IEEE Transactions on Dependable and Secure Computer, 1(3): 179-189, Jul.-Sep. 2004.
Saha "Modeling Process Variability in Scaled CMOS Technology", IEEE Design & Test of Computers, 27(2): 8-16, Mar. 18, 2010.
Schramm et al. "Higher Order Masking of the AES", Proceedings of the 2006 the Cryptographers' Track at the RSA Conference on Topics in Cryptology, CT-RSA 2006, San Jose, CA, USA, Feb. 13-17, 2006, p. 208-225, Feb. 13, 2006.
Shamir "Protecting Smart Cards From Passive Power Analysis With Detached Power Supplies", Proceedings of the Second International Workshop on Cryptographic Hardware and Embedded Systems, CHES '00, Worcester, MA, USA, Aug. 17-18, 2000, LNCS 1965: 71-77, Aug. 17, 2000.
Shang et al. "High-Security Asynchronous Circuit Implementaiton of AES", IEE Proceedings—Computers and Digital Techniques, 153(2): 71-77, Mar. 6, 2006.
Sharma et al. "Signal Integrity and Propagation Delay Analysis Using FDTD Technique for VLSI Interconnects", Journal of Computational Electronics, 13(1): 300-306, Published Online Nov. 9, 2013.
Sokolov et al. "Design and Analysis of Dual-Rail Circuits for Security Applications", IEEE Transactions on Computers, 54(4): 449-460, Published Online Feb. 15, 2005.
Sokolov et al. "Improving the Security of Dual-Rail Circuits (Revision 2)", School of Electrical, Electronic & Computer Engineering, University of Newcastle Upon Tyne, UK, Technical Report Series, NCL-EECE-MSD-TR-2004-101-Rev.2, p. 1-22, Jan. 2004.
Standaert et al. "A Unified Framework for the Analysis of Side-Channel Key Recovery Attacks", Proceedings of the 28th Annual International Conference on the Theory and applications of Cryptographic Techniques—Advances in Cryptology, EUROCRYPT 2009. Cologne, Germany, Apr. 26-30, 2009, LNCS 5459: 443-461, Apr. 26, 2009.
Stojanovic et al. "Comparative Analysis of Master-Slave Lathces and Flip-Flops for High-Performance and Low-Power Systems", IEEE Journal of Solid-State Circuits, 34(4): 536-548, Apr. 1999.
Suzuki et al. "Security Evaluation of DPA Countermeasures Using Dual-Rail Pre-Charge Logic Style", Proceedings of the 8th International Conference on Cryptographic Hardware and Embedded Systems, CHES 2006, Yokohama, Japan, Oct. 10-13, 2006, p. 255-269, Oct. 10, 2006.
Tiri et al. "A Logic Level Design Methodology for a Secure DPA Resistant ASIC or FPGA Implementation", Proceedings of the Conference on Design, Automation and Test in Europe, DATE'04, Paris, France, Feb. 16-20, 2004, 1: 10246-1-10246-6, Feb. 16, 2004.
Tiri et al. "Charge Recycling Sense Amplifier Based Logic: Securing Low Power Security IC's Against DPA", Proceedings of the 30th European Solid-State Circuits Conference, ESSCIRC'04, Leuwen, Belgium, Sep. 23, 2004, p. 179-182, Sep. 23, 2004.
Tokunaga et al. "Securing Encryption Systems With a Switched Capacitor Current Equalizer", IEEE Journal of Solid-State Circuites, 45(1): 23-31, Published Online Dec. 23, 2009.
Triantis et al. "Thermal Noise Modeling for Short-Channel MOSFET's", IEEE Transactions on Electron Devices, 43(11): 1950-1955, Nov. 1996.
Vaquie et al. "Secure D Flip-Flop Against Side Channel Attacks", IET Circuits, Devices & Systems, 6(5): 347-354, Sep. 2012.
Waddle etal. "Towards Efficient Second-Order Power Analysis", International Workshop on Cryptographic Hardware and Embedded Systems, CHES 2004, Cambridge, MA, USA, Aug. 11-13, 2004, 6(3156): 1-15, Aug. 11, 2004.
Wang et al. "Role of Power Grid in Side Channel Attack and Power-Grid-Aware Secure Design", Proceedings of the 50th Annual Design Automation Conference, DAC'13, Austin, TX, USA, May 29-Jun. 7, 2013, Art.78: 1-9, May 29, 2013.
Welch "The Generalization of 'Student's' Problem When Several Different Population Variances Are Involved", Biometrika, 34(1/2): 28-35, Jan. 1947.
Wu et al. "Measurement and Evaluation of Power Analysis Attacks on Asynchronous S-Box", IEEE Transactions on Instrumentation and Measurement, 61(10): 2765-2775, Published Online Jun. 11, 2012.
Xu et al. "Timing Uncertainty in 3-D Clock Trees Due to Process Variations and Power Supply Noise", IEEE Transactions on Very Large Scale Integration (VLSI) Systems, 21(12): 2226-2239, Published Online Jan. 11, 2013.
Yang et al. "Power Attack Resistant Cryptosystem Design: A Dynamic Voltage and Frequency Switching Approach", Proceedings of the Design, Automation and Test in Europe Conference and Exhibition, DATE'05, Munich, Germany, Mar. 7-11, 2005, 3: 64-69, Mar. 7, 2005.
Official Action dated Feb. 27, 2019 From the US Patent and Trademark Office Re. U.S. Appl. No. 15/636,902. (34 pages).
International Search Report and the Written Opinion dated May 30, 2019 From the International Searching Authority Re. Application No. PCT/IL2019/050230. (9 Pages).

\* cited by examiner

PSEUDO-ASYNCHRONOUS DIGITAL CIRCUIT DESIGN

RELATED APPLICATIONS

This application is a National Phase of PCT Patent Application No. PCT/IL2017/050727 having International filing date of Jun. 29, 2017, which claims the benefit of priority under 35 USC § 119(e) of U.S. Provisional Patent Application No. 62/355,891 filed on Jun. 29, 2016. The contents of the above applications are all incorporated by reference as if fully set forth herein in their entirety.

FIELD AND BACKGROUND OF THE INVENTION

The present invention, in some embodiments thereof, relates to logic element design, and, more particularly, but not exclusively, to logic element design to combat side channel attacks.

Electronic circuits leak information related to their internal signals through their power consumption. Power analysis (PA) attack procedures abuse this information to gain access to secret information.

PA attack procedures take place in several steps. The first involves the preprocessing of the current traces, segmentation, and then synchronization of the segments. Since current traces are noisy, PA attacks rely on statistics and their success depends on the attacker's ability to preprocess the data. In conventional synchronous circuits, synchronization is inherently possible. For the analysis, d points in time are examined per computation (d is referred to as the order of the analysis). As the number of these Points-Of-Interest (POI) increase (if shares in threshold-implementation or masks in masking countermeasures are manipulated at different times), the PA becomes (computationally) harder to execute. These POIs can be located within a single clock cycle or across several cycles depending on the circuit/algorithm implementation. The complexity of finding fixed POIs for masking implementations increases with d.

Countermeasures against side-channel attacks (SCA) are usually implemented in the algorithmic or Boolean levels (e.g. masking, Threshold-Implementation, TI). There are currently two main approaches to coping with information leakage: hiding and masking. Masking refers to manipulations of the (internal) values, whereas hiding typically aims to consume an equivalent amount of energy or random energy per cycle. The latter can be achieved by amplitude or temporal manipulations of the power signal. Common techniques include dual-rail based designs, current-mode-logic based designs, power regulation techniques and random changes in the current amplitude or computation time. Valuable information also leaks from the leakage currents of gates and transistors in the Steady state. Although these currents are substantially smaller they constitute a real concern.

Unfortunately, over time, many of the so called secured schemes were broken due to design faults, incorrect modeling of the leakage (e.g. internal functions in masking or TI or glitches) or improved attack methodologies (e.g. High-Order, HO, multivariate or profiling based attacks).

Additional background art includes:
[1] S. Mangard, E. Oswald, and T. Popp, *Power Analysis Attacks: Revealing the Secrets of Smart Cards*. Springer, 2008.
[2] T. S. Messerges, "Using Second-Order Power Analysis to Attack DPA Resistant Software," in *Cryptographic Hardware and Embedded Systems—CHES* 2000, Ç . K. Koç and C. Paar, Eds. Springer Berlin Heidelberg, 2000, pp. 238-251.
[3] B. Gierlichs, K. Lemke-Rust, and C. Paar, "Templates vs. stochastic methods," in *International Workshop on Cryptographic Hardware and Embedded Systems,* 2006, pp. 15-29.
[4] D. Sokolov, J. Murphy, A. Bystrov, and A. Yakovlev, "Design and analysis of dual-rail circuits for security applications," *IEEE Transactions on Computers*, vol. 54, no. 4, pp. 449-460, April 2005.
[5] A. Cevrero, F. Regazzoni, M. Schwander, S. Badel, P. Ienne, and Y. Leblebici, "Power-gated mos current mode logic (pg-mcml): A power aware dpa-resistant standard cell library," in *Design Automation Conference (DAC)*, 2011 48th ACM/EDAC/IEEE, 2011, pp. 1014-1019.
[7] M. Bucci, M. Guglielmo, R. Luzzi, and A. Trifiletti, "A Power Consumption Randomization Countermeasure for DPA-Resistant Cryptographic Processors," in *Integrated Circuit and System Design. Power and Timing Modeling, Optimization and Simulation*, E. Macii, V. Paliouras, and O. Koufopavlou, Eds. Springer Berlin Heidelberg, 2004, pp. 481-490.
[8] M. Bucci, R. Luzzi, M. Guglielmo, and A. Trifiletti, "A countermeasure against differential power analysis based on random delay insertion," in *IEEE International Symposium on Circuits and Systems,* 2005. ISCAS 2005, 2005, pp. 3547-3550 Vol. 4.
[9] L. Loder, A. de Souza, M. Fay and R. Soares, "Towards a framework to perform DPA attack on GALS pipeline architectures," in *Proceedings of the 27th Symposium on Integrated Circuits and Systems Design,* 2014, p. 33.
[10] S. Yang, W. Wolf, N. Vijaykrishnan, D. N. Serpanos, and Y. Xie, "Power Attack Resistant Cryptosystem Design: A Dynamic Voltage and Frequency Switching Approach," in *Proceedings of the Conference on Design, Automation and Test in Europe—Volume* 3, Washington, D.C., USA, 2005, pp. 64-69.
[11] M. Alioto, L. Giancane, G. Scotti, and A. Trifiletti, "Leakage Power Analysis attacks: Well-defined procedure and first experimental results," in 2009 *International Conference on Microelectronics (ICM),* 2009, pp. 46-49.
[12] M. Alioto, L. Giancane, G. Scotti, and A. Trifiletti, "Leakage Power Analysis attacks: Well-defined procedure and first experimental results," in 2009 *International Conference on Microelectronics (ICM),* 2009, pp. 46-49.
[13] M. Alioto, L. Giancane, G. Scotti, and A. Trifiletti, "Leakage power analysis attacks: A novel class of attacks to nanometer cryptographic circuits," *IEEE Trans. Circuits Syst. Regul. Pap.*, vol. 57, no. 2, pp. 355-367, 2010.
[14] M. Alioto, S. Bongiovanni, M. Djukanovic, G. Scotti, and A. Trifiletti, "Effectiveness of Leakage Power Analysis Attacks on DPA-Resistant Logic Styles Under Process Variations," *IEEE Trans. Circuits Syst. Regul. Pap.*, vol. 61, no. 2, pp. 429-442, February 2014.
[15] M. Alioto, S. Bongiovanni, G. Scotti, and A. Trifiletti, "Leakage Power Analysis attacks against a bit slice implementation of the Serpent block cipher," in *Mixed Design of Integrated Circuits Systems (MIXDES),* 2014 *Proceedings of the 21st International Conference,* 2014, pp. 241-246.
[16] S. M. Del Pozo, F.-X. Standaert, D. Kamel, and A. Moradi, "Side-channel attacks from static power: When should we care?," in *Proceedings of the* 2015 *Design, Automation & Test in Europe Conference & Exhibition,* 2015, pp. 145-150.
[17] M. Alioto, M. Poli, and S. Rocchi, "A General Power Model of Differential Power Analysis Attacks to Static Logic Circuits," *IEEE Trans. Very Large Scale Integr. VLSI Syst.*, vol. 18, no. 5, pp. 711-724, May 2010.

[18] A. Moradi, A. Poschmann, S. Ling, C. Paar, and H. Wang, "Pushing the limits: a very compact and a threshold implementation of AES," in Annual International Conference on the Theory and Applications of Cryptographic Techniques, 2011, pp. 69-88.
[19] B. Bilgin, B. Gierlichs, S. Nikova, V. Nikov, and V. Rijmen, "A more efficient AES threshold implementation," in International Conference on Cryptology in Africa, 2014, pp. 267-284.
[20] B. Bilgin, B. Gierlichs, S. Nikova, V. Nikov, and V. Rijmen, "Higher-order threshold implementations," in International Conference on the Theory and Application of Cryptology and Information Security, 2014, pp. 326-343.

SUMMARY OF THE INVENTION

Embodiments of the invention described herein combat SCA attacks by using a pseudo-asynchronous design style to spread points of interest of attackers over the clock cycle period and vary the amplitude of the leaked side channel in those points of interest. Gate level hiding mechanisms embedded within logic elements and logic circuit blocks introduce these variations which are random and/or internal-data dependent, making it difficult for the attacker to filter or average their effect out.

In embodiments of the invention, the clock signal and/or power supply voltage into a logic element (also denoted herein a logic circuit) are varied in order to introduce asynchronies into current usage, so as to combat power analysis (PA) attacks.

Optionally one or both types of variations are data-dependent, and are introduced into circuit operation based on data levels at internal nodes of the logic element. Alternately or additionally, one or both types of variations are introduced into circuit operation based on random data.

According to an aspect of some embodiments of the present invention there is provided a logic element which includes a logic block, a clock generator, a clock assigner and at least one sampling element. The logic block implements a logic function on input data to obtain a plurality output data signals. The output data signals are sampled by respective clock signals. The clock generator generates phase-shifted clock signals from a reference clock signal. The clock assigner assigns differing ones of the phase-shifted clock signals to respective output data signals. The sampling element(s) sample the output data signals in accordance with the respective assigned phase-shifted clock signals.

According to some embodiments of the invention, the clock assigner assigns the respective phase-shifted clock signals in accordance with functions of the input data.

According to some embodiments of the invention, the clock assigner assigns the respective phase-shifted clock signals in accordance with signals at internal nodes of the logic block.

According to some embodiments of the invention, the clock assigner assigns the respective phase-shifted clock signals by selecting one of a set of permutations of the phase-shifted clock signals in accordance with functions of the input data.

According to some embodiments of the invention, the clock assigner assigns the respective phase-shifted clock signals in accordance with random input to the clock as signer.

According to some embodiments of the invention, the clock assigner assigns the respective phase-shifted clock signals by randomly selecting one of a set of permutations of the phase-shifted clock signals.

According to some embodiments of the invention, the logic element further includes a delay element which provides the reference clock signal by delaying a logic circuit global clock signal.

According to some embodiments of the invention, the logic block includes combinational logic circuitry.

According to some embodiments of the invention, the logic block includes sequential logic circuitry.

According to an aspect of some embodiments of the present invention there is provided a method which:
implements, by a logic block comprising a plurality of logic gates, a logic function on input data to obtain a plurality of output data signals:
generates multiple phase-shifted clock signals from a reference clock signal;
assigns respective phase-shifted clock signals to the output data signals; and
samples the output data signals with the respective assigned clock signals.

According to some embodiments of the invention, respective phase-shifted clock signals are assigned in accordance with functions of the input data.

According to some embodiments of the invention, the method further includes assigning the respective phase-shifted clock signals by selecting one of a set of permutations of the phase-shifted clock signals in accordance with data input into the logic block.

According to some embodiments of the invention, the method further includes assigning the respective phase-shifted clock signals in accordance with at least one random input.

According to some embodiments of the invention, the method further includes assigning the respective phase-shifted clock signals by randomly selecting one of a set of permutations of the phase-shifted clock signals.

According to some embodiments of the invention, the method further includes generating the reference clock signal by delaying a logic circuit global clock signal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 1A:
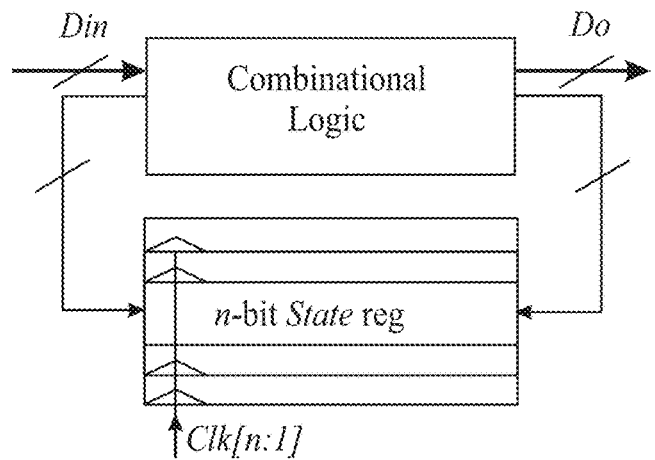
FIG. 1A is a simplified block diagram illustrating a finite state machine (FSM)

FIGS. 21A-21D respectively show the circuit scheme, Active and quasi-Steady state currents, tail of the Active currents and quasi-Steady currents of n sequential devices.

DESCRIPTION OF SPECIFIC EMBODIMENTS OF THE INVENTION

The present invention, in some embodiments thereof, relates to logic element design, and, more particularly, but not exclusively, to logic element design to combat side channel attacks.

Embodiments of the pseudo-asynchronous design methodology described herein (denoted p-Asynch design) utilize temporal and/or amplitude hiding. Switching activity current induced by the processed information may be hidden by dividing the current into small portions whose number depends on the current and previous values, and by allocating them in time varying locations within the cycle period. This makes the number of POIs required to characterize the power profile is significantly larger than the number that a computationally bounded d-order attacker can process. Manipulations of the supply voltage(s) may hide the leakage current particularly in the Steady state (Steady-region).

It is noted that although portions of the description discuss the use of clock allocation for the Active-region and power-gate selection for the Steady-region, this is for the purpose of explanation only and does not limit the implementation of either type of hiding to a particular region of circuit operation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

I. Circuit Design Styles

Common design styles currently include the Synchronous design, Asynchronous design and Globally Asynchronous Locally Synchronous (GALS). These design styles are now briefly described.

Figure 1B:
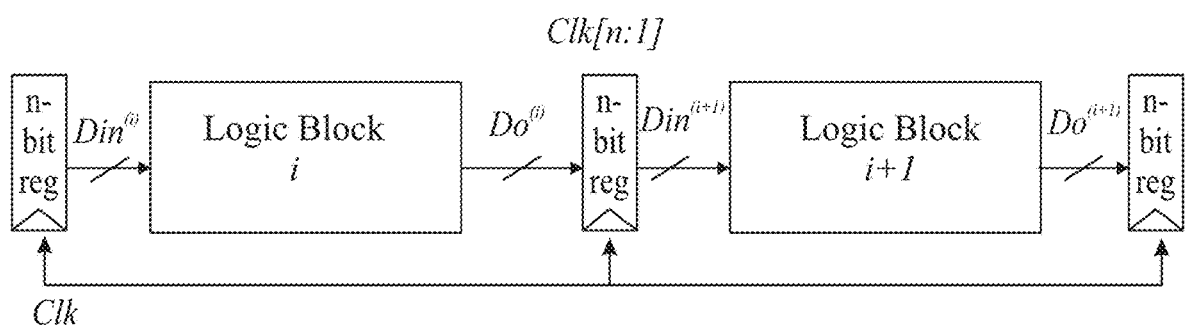
FIG. 1B is a simplified block diagram illustrating a synchronous design.
Figure 1C:
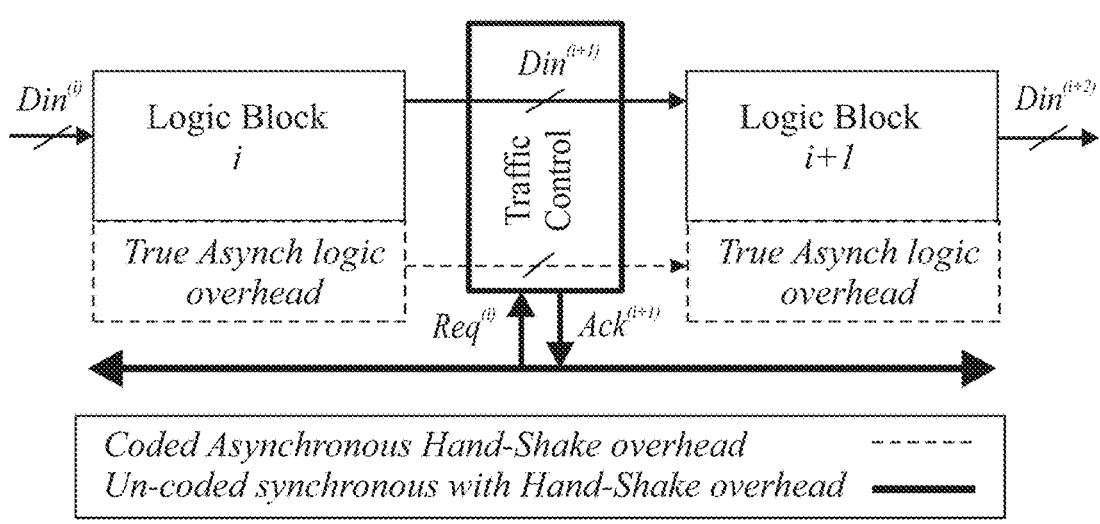
FIG. 1C is a simplified block diagram illustrating a true asynchronous design.
Figure 1D:
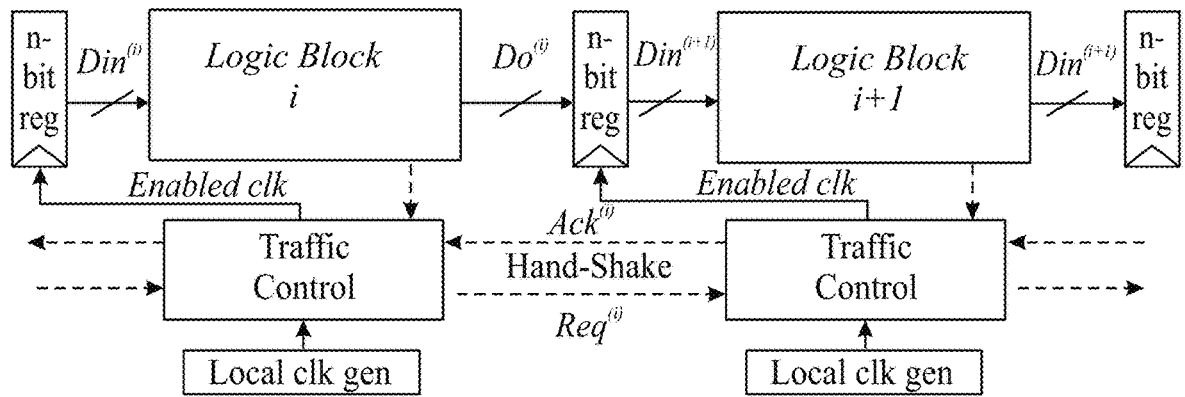
FIG. 1D is a simplified block diagram illustrating a GALS design.

FIG. 1A shows a general logic scheme of a Finite-State-Machine (FSM). In FIGS. 1B-1D (illustrating the difference between the synchronous, asynchronous and GALS design styles) the combinational part of FIG. 1A is divided into separate blocks.

A. Synchronous Design: A Single Clock Design Style.

In synchronous designs, all the outputs are sampled simultaneously. The clock period is set by the design's most critical path. Therefore, the registers (e.g. flip-flops) sampling times are data and logic independent.

In synchronous systems, most of the information leaks from the sequential elements since they typically have many transistors that dissipate large currents. Moreover, unlike combinational gates, the information leakage of these currents is synchronized with the clock. This fact simplifies the first stage of the attack (synchronization). For example, FIG. 1B depicts a synchronous design which includes a combinational circuit; e.g., an AddKey_SBOX with 4-bit input/output vectors. The AddKey_SBOX module is a cryptographic module; its inputs are plain text and a secret key, where each is a 4-bit vector. The outputs of the module are sampled by standard Master-Slave D-FFs (flip flops) from a standard-cell library provider.

Figure 2A:
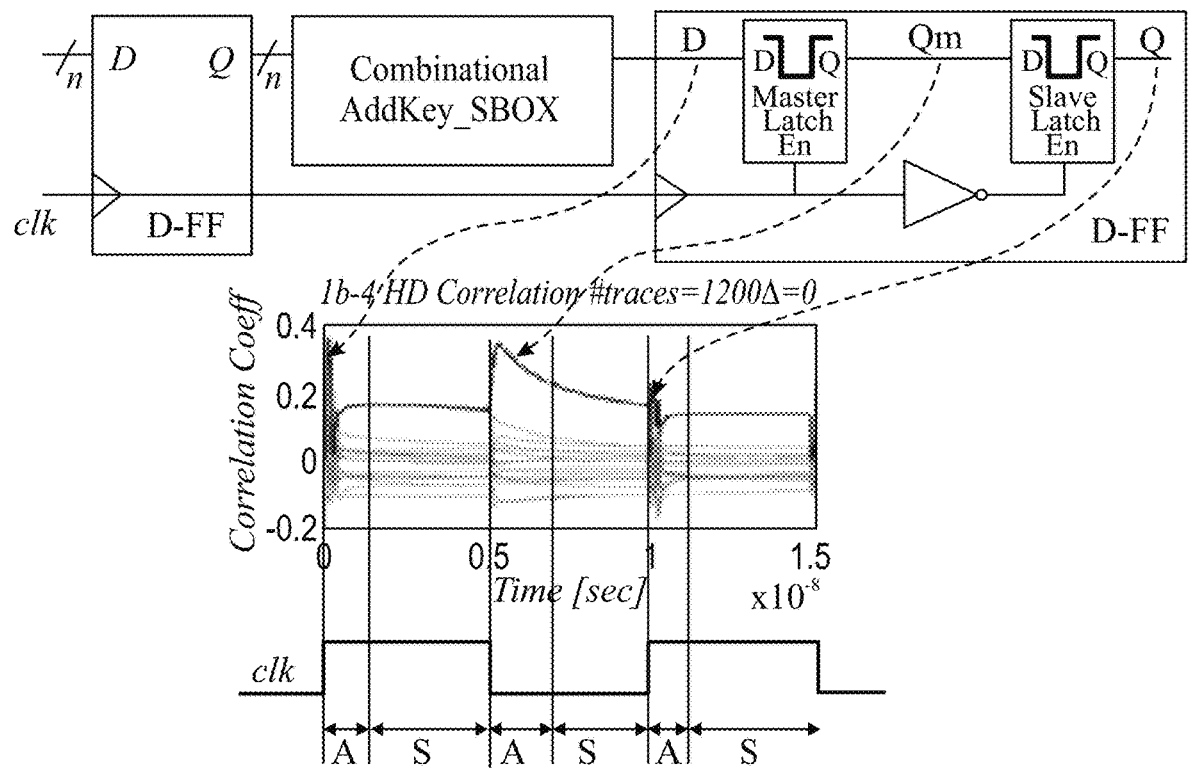
FIG. 2A is an illustrative synchronous design correlation plot for Hamming Distance (HD) based current model.

The bottom of FIG. 2A shows the correlation between a perfectly pre-processed (i.e., synchronized and filtered) dissipated current for a fixed key and an expected (hypothesized) current. Sixteen correlation functions, ρ(t), are plotted, one for each possible hypothesized key. The correlation values associated with the correct key appear as the solid black line. In general, relatively high correlation values correspond to high leakage. The schematic clock (clk) waveform indicates where information has leaked: the inputs to the combinational logic are launched at the rising edge of the clock. The signals propagate rapidly to the outputs, and show a correlation peak very close to time 0. This correlation peak is due to the current dissipation of the output combinational gate. The second very substantial correlation peak appears at the falling clock edge where the master-latch becomes transparent and the data flow. The third high correlation peak appears when the slave-latch becomes transparent and the data flow from Qm to Q. The time axis in FIG. 2A is divided into regions where signals change (active) denoted by A, and regions where the system is steady, denoted by S. In fact, both storing (sequential) and holding (combinational) elements leak information through leakage currents when the system is steady (S).

It is important to note that an attack can target a Single-bit and Multiple-bits simultaneously. A Single-bit (Multi-bit) PA attack is carried out on a single bit (set of bits) of the design during a series of transitions. Synchronous designs are very sensitive to PA since they utilize a single clock to sample all vectors for all the design modules.

B. Asynchronous Design: A Self-timed (Clockless) Design Style.

Asynchronous communication can be managed by a traffic control (also known as handshake) as shown in FIG. 1C. In the most general case the traffic control enables data transfer between blocks by utilizing request (Req) and acknowledge (Ack) signals. These control signals may be separated from the data signals or may be coded within the data signals. In the coded case, most asynchronous designs require much more logic and routing overhead (as illustrated in FIG. 1C).

In an asynchronous design the recorded (measured) current traces cannot be synchronized by pre-processing DSP algorithms because: 1) There are no time boundaries on a computation and 2) There are no (large) sequential elements that dissipate synchronized currents at the clock edges. Therefore, it is hard to conduct Single- and Multiple-bit attacks on asynchronous designs because the signals change depending on the data without a global synchronizing signal. Though considered secure, asynchronous designs are quite difficult to design and implement using standard tools and flows.

C. Globally Asynchronous Locally Synchronous (GALS) Design Style

GALS design combines concepts from both the synchronous and asynchronous approaches. In a GALS design, each local module is synchronized by local clock signals which are generated internally. GALS local modules communicate asynchronously in a form of a handshake mechanism; however, in the GALS case it is synchronized to a local clock (FIG. 1D). Here, the traffic control signals enable the local clocks (Enabled clk) to sample the block's input/output vectors simultaneously. The actual local clock period is data-dependent since the clock is only enabled when the traffic control unit receives a Req, and Ack has arrived. In other words, the duration until the next data transfer between blocks is unknown but is limited to multiples of the local clock period. From the hardware security perspective, if the attacker discovers the local block operating frequency, the design will become sensitive to PA attacks because all the block's bits are sampled simultaneously; that is, some synchronization does exist. Therefore, a GALS design is more secure than a synchronous design. However, it is less secure than an asynchronous design.

In conventional GALS, the local frequencies are deterministic. A GALS-based system dubbed R-GALS randomly assigns a different clock per module, in each/several computations. The R-GALS design was shown to be more secure than the GALS design.

II. Pseudo-Asynchroundous (pAsynch) Design

Embodiments and principals of the pseudo-Asynchronous (pAsynch) design are now presented. The p-Asynch design is compatible with and may be implemented in sequential logic and/or combinational logic.

The p-Asynch design is scalable to many levels, including but not limited to: a single logic gate, a logic circuit comprising multiple logic gates (and optionally other circuit elements such as switches and flip-flops), an integrated circuit (IC) chip and a digital system including multiple logic circuits on one or more IC chips.

Optional embodiments may be implemented in circuits, including, but not limited to an integrated circuit (IC) customized for a particular use, such as an Application-Specific Integrated Circuit (ASIC).

As used herein the terms 'key' and 'secret information' mean information which is not accessible via the main inputs/outputs (IOs) and which attackers try to reveal by analyzing the consumed current. When it is clear from the context, the word 'secret' is omitted and this secret information is referred to as 'information'.

As used herein the term 'inputs' mean the signals at the input of a block whose values are known or can be chosen by the attacker. Secret information is not considered an input.

As used herein the terms 'data' and 'processed-data' mean internal signals which depend on both the secret key and the inputs. The timing of the data signals depends on the current and previous keys and inputs. The data value is unknown to the attacker.

A. Pseudo Asynchronous Design Style—Clock Assignment

In terms of security, the main advantage of asynchronous systems is that outputs arrive at data- and design-dependent times (i.e. they are not deterministic). In some embodiments of the invention, the security of synchronous designs is leveraged by embedding asynchronous-like properties; that is, different outputs of the logic element or logic circuit are sampled at different times rather than periodically. This approach provides intra-cycle hiding because it manipulates the currents within the cycle period. Optionally, data-dependencies and/or randomness are employed to dynamically generate different sampling times for some or all sampling elements (e.g. FFs). This makes leaked information harder to exploit with a relatively low area overhead.

Unlike GALS designs where each module utilizes a single clock, in embodiments of the pAsynch architecture each bit may be asserted with a different clock. Optionally, data-dependencies are introduced so that clock cycles change in time depending on the processed data. The pAsynch design makes the extraction of the information significantly harder (as shown in the Examples below).

Major advantages of the pAsynch design over the true asynchronous and GALS designs are the utilization of a synchronous interface including compatibility with VLSI design flow and tools, the scale-up of designs to larger systems and the elimination of traffic control and special handshake data-coding.

Clock Provider

Figure 2B:
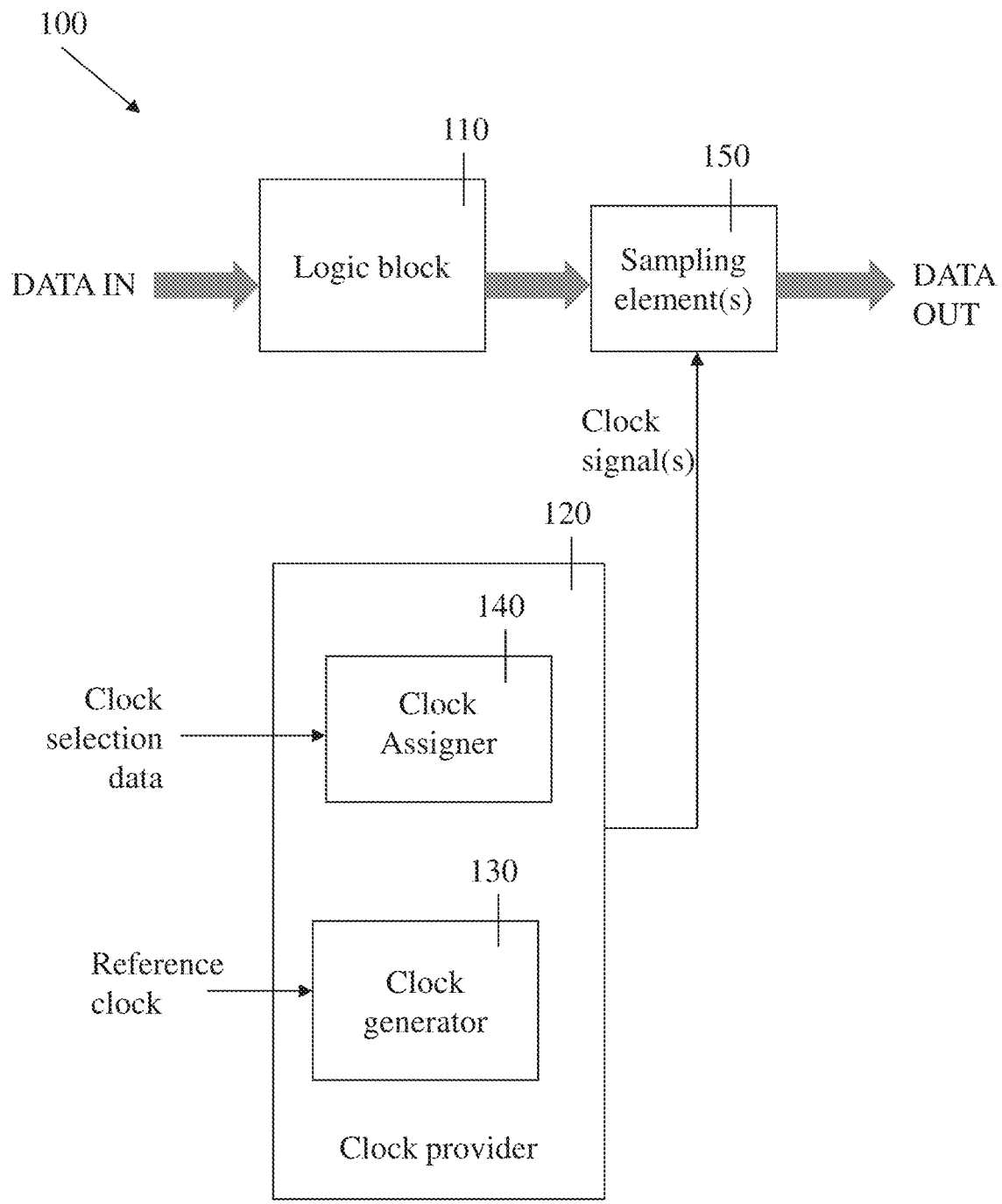
FIG. 2B is a simplified block diagram of a logic element, according to embodiments of the invention.

Reference is now made to FIG. 2B, which is a simplified block diagram of a logic element, according to embodiments of the invention. Logic element 100 includes logic block 110, clock generator 130, clock assigner 140 and sampling element(s) 150. In some portions of the description the clock generator and clock assigner are together denoted a clock provider.

Logic block 110 implements a logic function on input data to obtain a output data signals. Some or all of the output data signals are sampled by different respective clock signals. Embodiments of the invention vary the clock signals used for sampling the output data signals based on clock selection data which is obtained from one or more sources as described herein.

As used herein the term "logic block" is not limiting as to the scale, type or technology of the logic block.

Optionally, logic block 110 includes combinational and/or sequential logic circuitry.

Clock generator 130, generates multiple clock signals from a reference clock signal. The clock signals are phase-shifted versions of the reference clock. Optionally the phase shift between subsequent clock signals is equal for all the phase-shifted clock signals.

Optionally, in order to provide phase-shifted versions of the reference clock, the reference clock enters an n-clock phase shifter where each phase is shifted by some delay. Optionally the delays are implemented by delay elements comprising one or a combination of: buffers, logical gates, a resistive element and/or a capacitive element of the implementation technology.

Alternately or additionally, in order to provide phase-shifted versions of the reference clock, the reference clock, Clk, enters an n-clock phase shifter where each phase, i, is shifted by $\Delta \cdot t_{min}$. That is, $Clkp[i](t)=Clk(t+i \cdot \Delta \cdot t_{min})$ where $\Delta$ is an integer and $t_{min}$ is the delay in units of seconds of a minimum delay element. Optionally the delays are implemented by delay elements comprising one or a combination of: buffers, logical gates or a resistive element of the implementation technology.

Optionally the same reference clock signal is used by multiple logic elements in a logic circuit.

Clock assigner 140 assigns a respective phase-shifted clock signal to sample each of the output data signals. The clock signals are assigned based on clock selection data which is obtained from one or more sources. Exemplary embodiments for different types of selection data and manners of using the selection data are described below.

Sampling element(s) 150 sample the output data signals with the respectively assigned clock signal.

Optionally, each output data signal is sampled by a dedicated sampling element. In alternate embodiments, a single sampling element samples multiple output data signals (according to their respectively assigned clock).

The sampling element may be of any type known in the art, such as a flip-flop, register or other electronic device triggered by the clock signal.

Since the clocks are phase-shifted, the data provided by logic element 100 as input to the following logic element(s) varies over the reference clock cycle. This causes transitions at internal nodes in the following logic element(s) within to vary in a pseudo-asynchronous manner which makes it difficult for an attacker to correlate current usage to transitions related to the actual input data.

Optionally, clock assigner 140 applies clock assignment logic to the clock selection data to assign respective clocks to the data output signals. The clock assignment logic may implemented in hardware (e.g. as interconnected logic gates forming the clock assigner) and/or may be performed by a processing element (e.g. processing capabilities within logic element 100).

Optionally the clock selection data includes one or more of:

i) Data input into the logic block;
ii) A function of the data input into the logic block;
iii) One or more signals at internal nodes of the logic block;
iv) A function of one or more signals at internal nodes of the logic block;
v) Random data;
vi) A function of the random data; and
vii) Any combination of (i-vi).

Using clock selection data which is affected by data input into logic block 110 (e.g. iii, iv) introduces data-dependency into the clock signal assignment, which is shown below to be effective in protecting against PA attacks. Optionally randomization is introduced into the clock signal assignment using random data (e.g. v, vi).

Optionally, techniques for assigning clocks to output data signals include but are not limited to:

a) A set of permutations of the phase-shifted clock signals is formed. Each permutation assigns a respective clock signal to each output signal. In each cycle, one of the permutations is selected randomly and/or based on input data into logic block 110; and b) Randomly assigning a clock signal to each data output signal separately.

Exemplary embodiments of these clock assignment techniques are the R-pAsynch, RP-pAsynch and DP-pAsynch designs described below.

Optionally, the reference clock is a delayed version of a global clock, which provides a reference clock signal to multiple logic elements of a logic circuit.

Optionally, logic element 100 includes a delay element which provides the reference clock signal by delaying the global clock signal. Alternately or additionally, one or more delay elements are positioned along the clock line leading from the global clock to the reference clock input of the logic element.

Figure 2C:
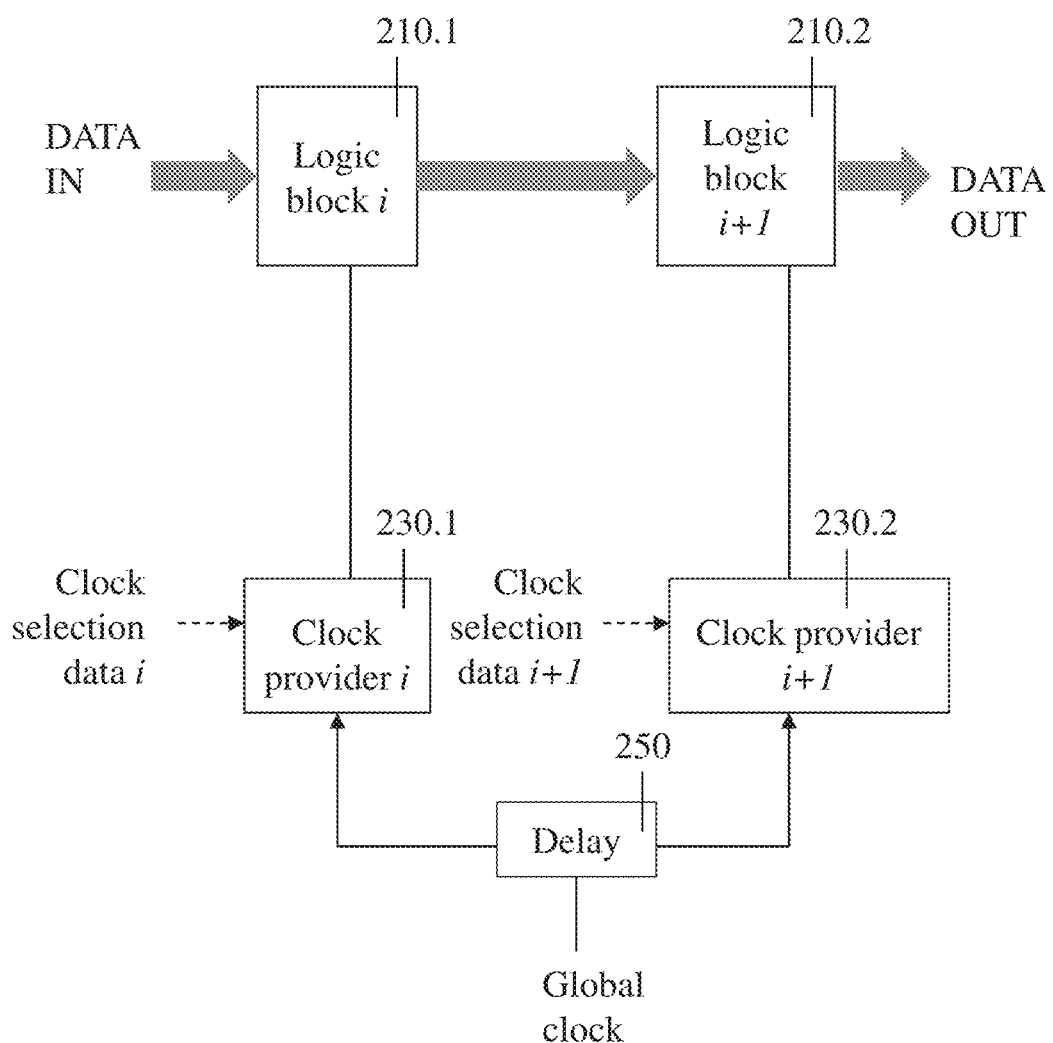
FIG. 2C is a simplified block diagram of two logic blocks with respective clock providers in series, according to embodiments of the invention.

Reference is now made to FIG. 2C, which is a simplified block diagram of a circuit with pAsynch design according to embodiments of the invention. Logic circuit 200 uses the same reference clock signal for two logic elements in series.

Logic circuit 200 includes two logic blocks (210.1 and 210.2) in series, where each of the logic blocks has a respective clock provider (230.1 and 230.2). The respective clock providers each operate as described above. Both clock providers use the same reference clock signal (i.e. the global clock). It is noted that the clock providers may base the assignment on different types of data and/or using different assignment logic.

Logic blocks may 210.1 and 210.2 may have different numbers of outputs. Optionally, clock providers 230.1 and 230.2 generate and/or select from a different number of phased-shifted clock signals.

FIG. 2C also includes delay element 250, which provides the global clock signal clock providers 230.1 and 230.2 with different delays, which may compensate for propagation delays along the chain of logic elements.

Figure 3:
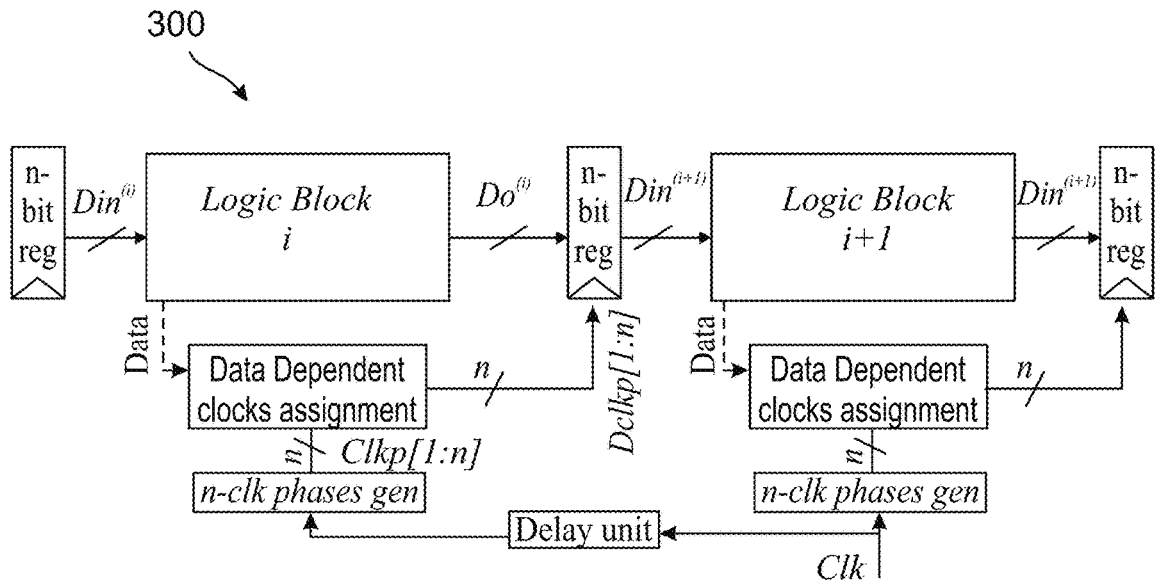
FIG. 3 is a simplified block diagram of a hand-shake free pAsynch design, according to embodiments of the invention.

Reference is now made to FIG. 3, which is a simplified circuit diagram of a pAsynch circuit design, according to an exemplary embodiment of the invention. Logic circuit 300 has the same basic architecture as logic circuit 200 in FIG. 2C. In logic circuit 300 the n bit output vector ($D_o^{(i)}$) is sampled by n different clock signals. First, n different phases (Clkp[1:n]) of the main clock are generated by the phase-gen module; each is shifted by a constant (predefined) delay. These clock signals (phases) are assigned randomly and/or data-dependently to the n sampling elements (Dclkp[1:n]). The assignment is performed at the clock frequency (time dependent).

Figure 4A:
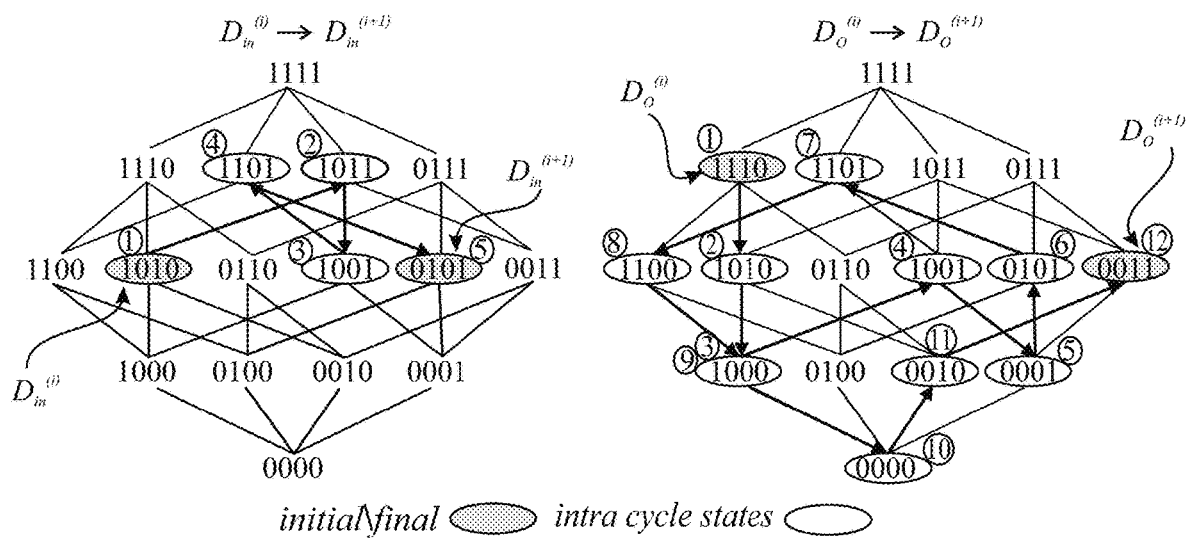
FIG. 4A is an example of input (Din) bit-by-bit changes from 1010 to 0101 and the corresponding Output (DO) intra cycle states sequence starting from 1110 to 0011.

Due to the n different sampling times of the inputs/outputs, bits of the new input vectors enter the block one by one in a random and/or a data-dependent order. For example, the left portion of FIG. 4A shows (in a Hasse diagram) a transition of an input vector (Din) from 1010 to 0101. This transition triggers a sequence of transitions at the output; the sequence as well as its length depend on the circuit implementation and may change as a function of noise, variations and logic delays. The right portion of FIG. 4A shows the path from the initial state of the output (1110) to its final state (0011), due to the (gradual) change in the input. In this example, the output of a 4-bit SBOX (DO) passes through 10 intermediate states (i.e., intra cycle states) before it stabilizes in the desired final state. This mechanism of gradual change has several advantages:

Requires a high number of intra-cycle hypotheses: for example, if two subsequent input vectors are at a Hamming distance (HD) of m, a brute force attacker needs to hypothesize at least m! alternatives for the set of single output bit transitions.

An attacker needs to correlate each set of intra cycle state hypotheses with a corresponding set of temporal Points-Of-Interest. This is in fact a High Order intra-cycle attack.

Reduced instantaneous signal to noise ratio SNR. The SNR is defined herein as the ratio between the exploitable current and the switching and thermal noise. The SNR may be reduced by $20 \cdot \log_{10}(n)$ [db], making it hard to allocate the POIs. (Even if allocated, more traces are required to filter the noise aside from having to hypothesize the intra cycle states.)

As the delay between the phases (Clkp) increases, the circuit will go through all the intra cycle states. This delay may be designer-tuned and almost impossible to disable.

Optionally, the clock phase assignment is data- and/or random-dependent. Exemplary embodiments of clock phase assignment include:

Random assignment (denoted herein R-pAsynch)—The n phases, Clkp[1:n], are chosen randomly from the set of n phases. Each register bit may be assigned to each phase with equal probability. The Data signal in FIG. 3 is connected to a random bits bus (Rnd) and is a true random assignment. In this design, the same phase may be applied to different registers in the same computation cycle since the clock phases are chosen randomly (R) per register bit on-the-fly (in each clock cycle). Therefore, this design is considered much more secure to Single- and Multi-bit attacks than GALS or R-GALS where the same clock is connected to all the local module registers for a series of clock cycles.

Random Permutation assignment (denoted herein RP-pAsynch)—The n clock phases are a random permutation of the set of n phases, Clkp[1:n]. Each permutation is equally likely to occur. The RP-pAsynch design is considered more secure than R-pAsynch and R-GALS since in the same clock cycle all the bits are sampled at different times.

Data-dependent Permutation (denoted herein DP-pAsynch)—The n clock phases are a data-dependent permutation of the set of n phases, Clkp[1:n].

Figure 4B:
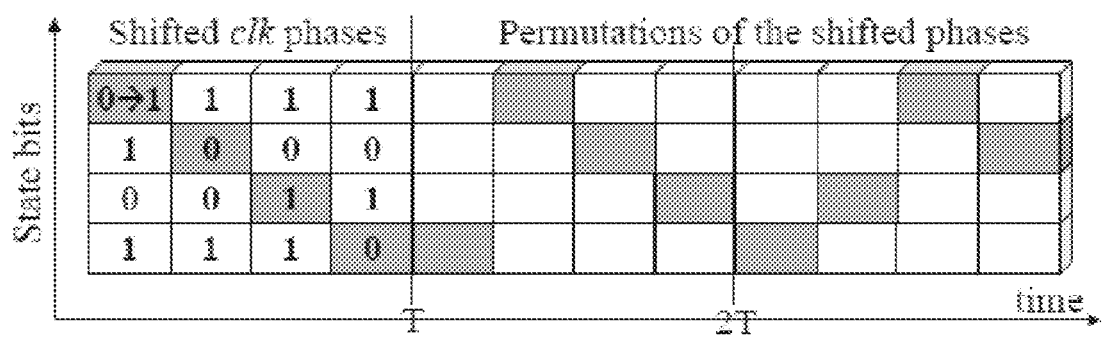
FIG. 4B is an example of data-dependent permutations of sampling times.
Figure 4C:
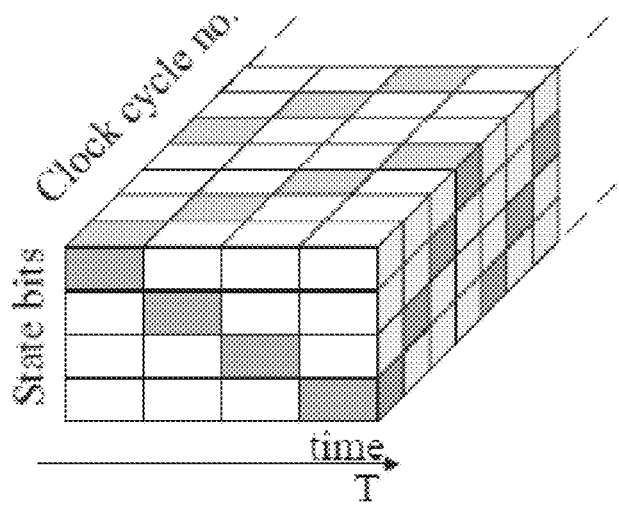
FIG. 4C is an example of segmented and synchronized cycles.

Both the R- and RP-pAsynch designs are controlled by random signals. Therefore, large enough statistics can filter the randomness out and make them vulnerable to both Single- and Multi-bit attacks. In contrast, the data-dependency of the DP-pAsynch cannot be filtered out. When properly designed, the phases assigned in the DP-pAsynch to each register bit will be uniformly distributed. An illustration of the Latin-Square-like design of the phases is shown in FIGS. 4B-4C.

Clock Assignment Method

Figure 2D:
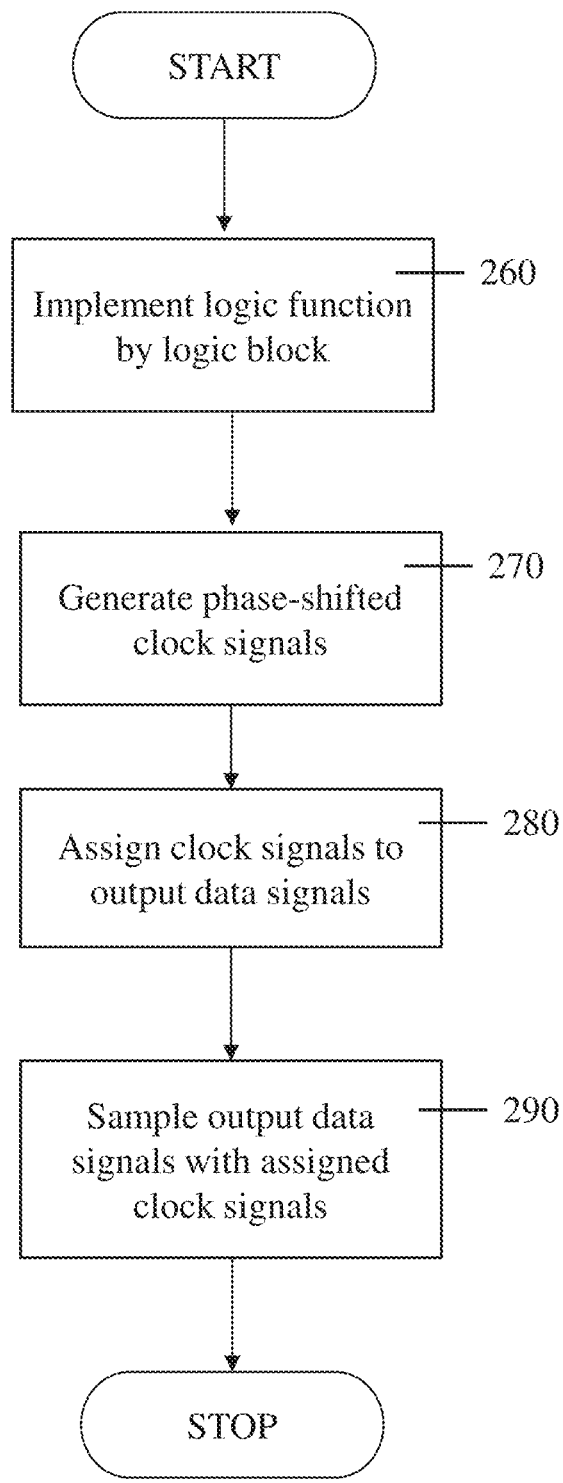
FIG. 2D is a simplified flowchart of a method for sampling logic block outputs, according to embodiments of the invention.

Reference is now made to FIG. 2D, which is a simplified flowchart of a method for sampling logic block outputs, according to embodiments of the invention.

In 260, a logic block implements a logic function on input data to obtain multiple output data signals. The logic block includes interconnected logic gates. In 270, multiple phase-shifted clock signals are generated from a reference clock signal. In 280, respective phase-shifted clock signals are assigned to the output data signals. In 290 the output data signals are sampled with the respective assigned clock signals.

Optionally, the respective phase-shifted clock signals are assigned in accordance with at least one of:

i) Data input into the logic block;
ii) A function of the data input into the logic block;
iii) One or more signals at internal nodes of the logic block;
iv) A function of one or more signals at internal nodes of the logic block;
v) Random data;
vi) A function of the random data; and
vii) Any combination of (i-vi).

Exemplary embodiments for assigning clocks to output data signals include but are not limited to:

a) A set of permutations of the phase-shifted clock signals is formed. Each permutation assigns a respective clock signal to each output signal. In each cycle, one of the permutations is selected randomly;

b) Randomly assigning a clock signal to each data output signal separately;

c) Selecting one of the permutations based on the input data into the logic block; and d) Selecting one of the permutations based on signals at internal nodes of the logic block.

Optionally, the method further includes generating the reference clock signal by delaying a logic circuit global clock signal.

Optionally, the method further includes providing a data-dependent supply voltage to the logic block.

B. pAsynch Design—Power Gate Selection

In some embodiments of the invention, internal data dependency and/or randomness are utilized to manipulate the supply voltages independently for some or all of the elements in the logic circuit. This manipulation may be particularly effective for hiding the information that leaks from devices in the Steady state.

Supply Voltage Provider

Figure 4D:
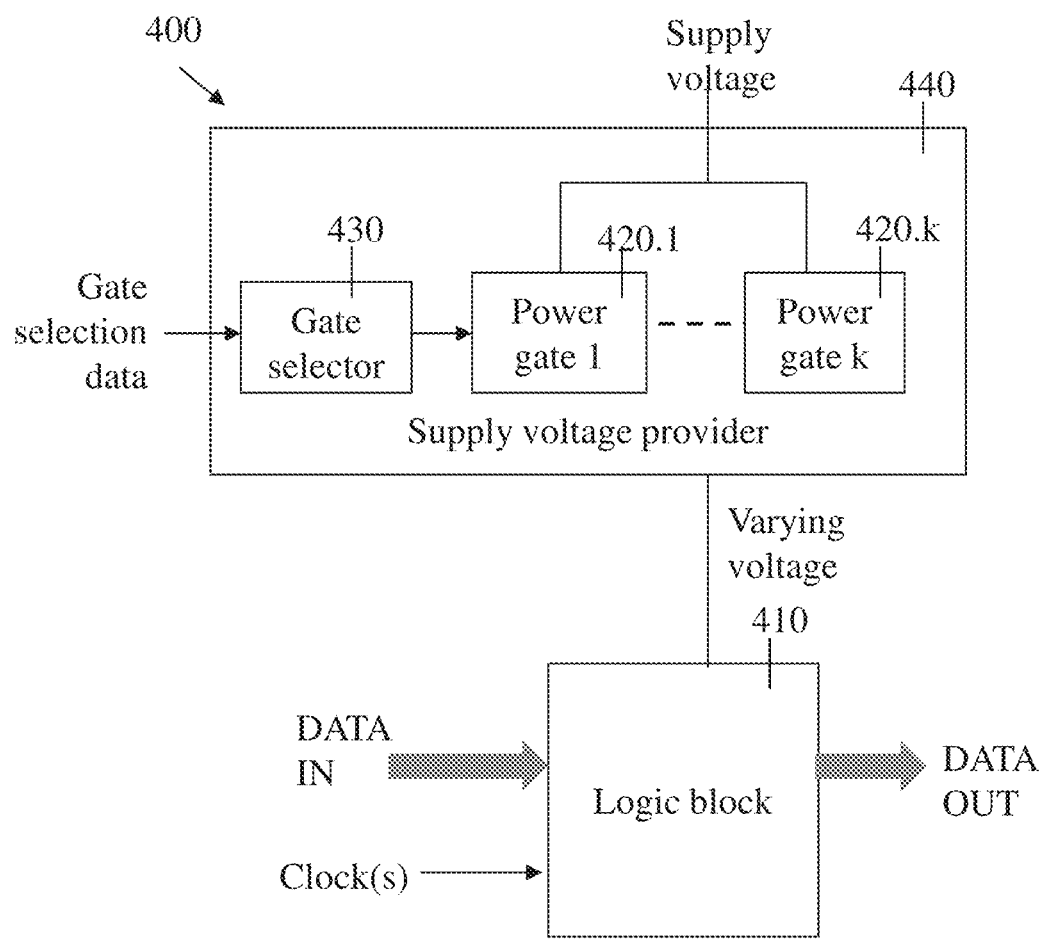
FIG. 4D is a simplified block diagram of a logic element, according to respective embodiments of the invention.

Reference is now made to FIG. 4D, which is a simplified block diagram of a logic element, according to embodiments of the invention. Logic element 400 includes logic block 410 which receives a supply voltage through one of switchable power gates 420.1-420.k. At least two of the power gates have different respective electrical properties (e.g. voltage drops when open). In some portions of the description the power gates and gate selector are together denoted a supply voltage provider.

FIG. 4D illustrates a basic implementation of pAsynch design with power gate selection, in which a single logic block is powered by a single supply voltage. This approach may be scaled up or down according to the circuit design and required security levels (exemplary embodiments are described below).

Optionally, the supply voltage is input into the logic circuit from one or more external voltage source(s).

Optionally, at least two of the power gates have different respective voltage thresholds. Further optionally, some of the power gates are of nMOS type and at least one of the power gates is of pMOS type. The nMOS devices are optionally low voltage threshold (LVT) nMOS gate(s). Further optionally, some of the power gates are of pMOS type and at least one of the power gates is of nMOS type. The pMOS devices are optionally standard voltage threshold (SVT) pMOS gate(s).

Based on gate selection data, gate selector 430 selects which set of the power gate will connect logic block 410 to the supply voltage. Power gates 420.1-420.k transfer the supply voltage from the supply voltage input to logic block 410, and are switched on by respective gate control signals which are provided by gate selector 430. Optionally, at any given time during logic element operation a single one of the gates is switched on.

The power gates may connect the supply voltage to electronic elements at various levels of the implementation structure, including but not limited to: a logic gate, interconnected logic gates, electronic elements (such as flip-flop, sampling element, latch, switch etc.) and combinations thereof.

Power gate selection and/or switching may be performed at any time in the circuit operation, in the active region and/or steady-state region of circuit operation.

Optionally, power gate selection is performed per cycle of the clock signal, and gate selector 430 selects a power gate for each cycle based on current gate selection data.

Optionally, power gate selection is performed intra-cycle, and gate selector 430 changes the selected power gate one or more times within the clock cycle based on the gate selection data.

Optionally, gate selector 430 selects the power gate based on gate selection logic applied to the gate selection data. The gate selection logic may implemented in hardware (e.g. as interconnected logic gates forming the gate selector) and/or may be performed by a processing element (e.g. processing capabilities within logic element 400).

i) Data input into the logic block;
ii) A function of the data input into the logic block;
iii) One or more signals at internal nodes of the logic block;
iv) A function of one or more signals at internal nodes of the logic block;
v) Random data;
vi) A function of the random data; and
vii) Any combination of (i-vi).

Optionally, gate selector 430 takes into account previous power gate selections, which may help ensure that the current into the logic element is sufficiently variable to protect against an attack. For example, the gate selection logic may prevent the same power gate from being selected for two consecutive clock cycles.

Non-limiting exemplary embodiments of logic elements with power gate selection include but are not limited to:

a) The logic element is powered at multiple supply voltage levels, some or all of which are transferred to the logic block via a supply voltage provider. The gate selection may be made for each supply voltage separately or there may be joint power gate selection for multiple supplies;

b) A single supply voltage is input to the logic element through parallel connections. One or more of these parallel connections is transferred to the logic block via a supply voltage provider;

Optionally, logic block 410 includes combinational and/or sequential logic circuitry.

Figure 5:
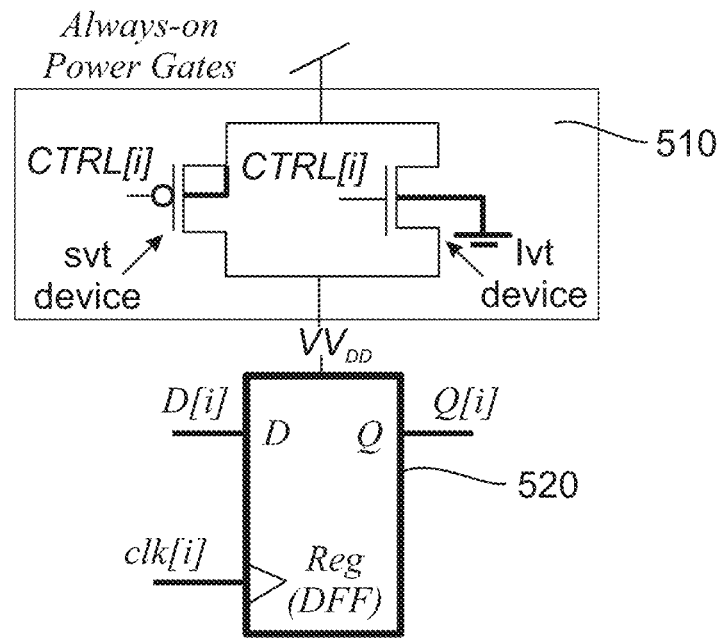
FIG. 5 is a simplified block diagram of a D flip-flop (FF) with power gate selection, according to exemplary embodiments of the invention.

Reference is now made to FIG. 5, which is a simplified block diagram of a single D-FF with power gate selection, according to an exemplary embodiment of the invention.

In FIG. 5, a data-dependent always-on power gate was embedded in the flip-flop design. This data-dependent power gate selectively opens a Low $V_T$ (LVT) nMOS device or a standard $V_T$ (SVT) pMOS device. This provides a Virtual-$V_{DD}$ ($VV_{DD}$) to each one of the FFs. The CTRL signals are wired from the SBOX internal nodes which are key- and data-dependent. In each cycle the CTRL signal switches the module supply data-dependently between $V_{DD}$ and ($V_{DD}-V_{Tlow}$). Not knowing the secret key or the (internal) CTRL signal functionality will prevent an attacker from weighing the hypothetical leakage currents correctly (per bit). Ultra LVT devices may be used to reduce the Static energy consumption of the design.

Optionally, in a more complex logic element, a respective power gate is embedded in some or all of the flip-flops in the logic element.

Figure 6A:
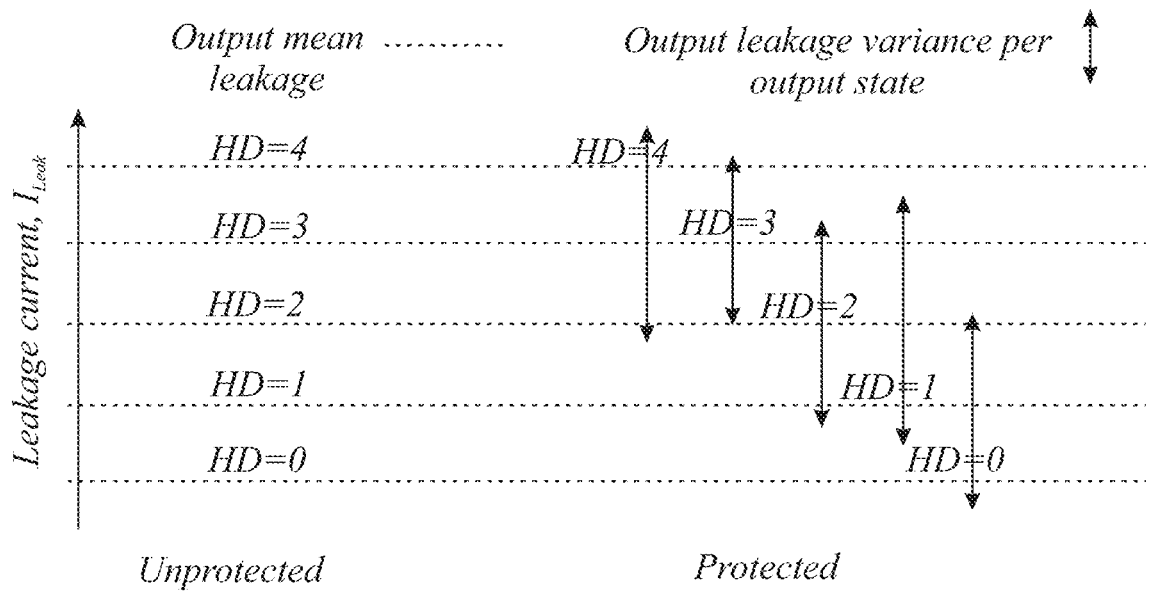
FIG. 6A illustrates the unprotected and protected design leakage current distribution.

The effect of the data-dependent power gates is illustrated by FIG. 6A. The average leakage current of the outputs of an unprotected design increases monotonically with the HD (as discussed in section VI below).

In embodiments of the protected pAsynch design, the leakage of each of these states varies as a function of the state of the internal signals. That is, for each input vector leading to the same output HD, multiple internal HW states are possible, thus leading to different leakage currents for each vector. The variance values for each HD state depend on the specific internal signals, the physical dimensions, and the number of power gates that were chosen. Note that typically the differences between leakage currents are very small (nano amperes) and minute changes in the dimensions and quantity of power gates may be sufficient to induce a large current variance and hence better hide the information, as illustratively shown in FIG. 6A.

Supply Voltage Delivery Method

Figure 6B:
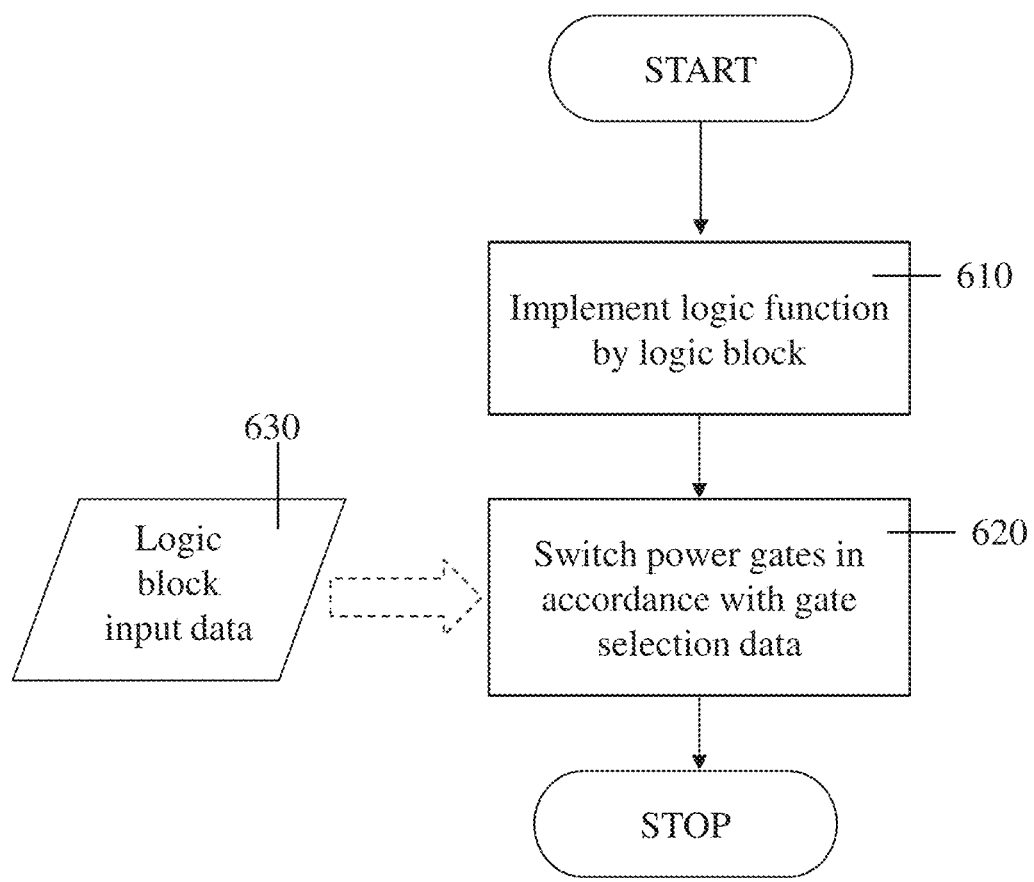
FIG. 6B is a simplified flowchart of a method of providing a supply voltage, according to embodiments of the invention.

Reference is now made to FIG. 6b, which is a simplified flowchart of a method of providing a supply voltage, according to embodiments of the invention.

In 610, a logic block implements a logic function on input data. The logic block is connected to a supply voltage input via a multiple switchable power gates. Each of the power gates having a respective voltage drop when open. At least two of the power gates have different electrical properties.

Typically the logic block includes interconnected logic gates.

In 620, one of the power gates is selected based on gate selection data and is switched on, thus connecting the logic block to the supply voltage. The selected power gate changes when the gate selection data changes. Optionally the gate selection data includes data input to the logic block 630 and/or signals from internal nodes in the logic block and/or random signals.

It is noted that the operation of the logic block (e.g. implementing the logic function) and the power gate switching are performed concurrently, in order to power the logic block.

Optionally, a different power gate is selected per clock cycle.

Optionally, at least two of the power gates have different respective voltage thresholds. For example, one of the power gates may be a low voltage threshold (LVT) nMOS gate and another power gate may be a standard voltage threshold (SVT) pMOS gate.

Optionally, the logic block outputs multiple output data signals, and the output data signals are sampled by respective phase-shifted clock signals selected in accordance with clock selection data.

The method may be implemented to manipulate the voltage supplied to circuit elements at different levels of the logic circuit architecture, including but not limited to: single logic gate, logic block, other powered logic device in the logic element or circuit, IC supply voltage, etc.

Embodiments presented herein employ a pseudo-asynchronous design which combines the security advantages of asynchronous circuits with the ease of synchronous circuit design. Randomization and/or data-dependencies (DD) may be utilized for temporal and/or amplitude hiding of information leakage during circuit operation. The pAsynch design hides information leakage by the current dissipation, making the critical synchronization of power supply current traces difficult for an attacker to accomplish.

A significant benefit of pseudo-asynchronous circuit design is that it a low-cost and simple design methodology that can coexist with other architectural and logic level countermeasures such as masking or threshold-implementation. Circuit level analyses and simulations presented below demonstrate that it is harder to exploit the information leakage from internal signals of the pAsynch design than from CMOS-based synchronous designs or other forms of temporal hiding countermeasures based on pure randomization.

It is expected that during the life of a patent maturing from this application many relevant logic elements, logic blocks, logic circuits, logic gates, delay elements, power gates, electronic devices, clock signals and phase-shifters for clock signals will be developed and the scope of the term logic element, logic block, logic circuit, logic gate, delay element, power gate, electronic device, clock signal and phase-shifted clock signal is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find calculated support in the following examples.

EXAMPLES

Reference is now made to the following examples, which together with the above descriptions illustrate some embodiments of the invention in a non limiting fashion.

III. Technology Evaluation Methodology

A. Test Bench

Figure 7A:
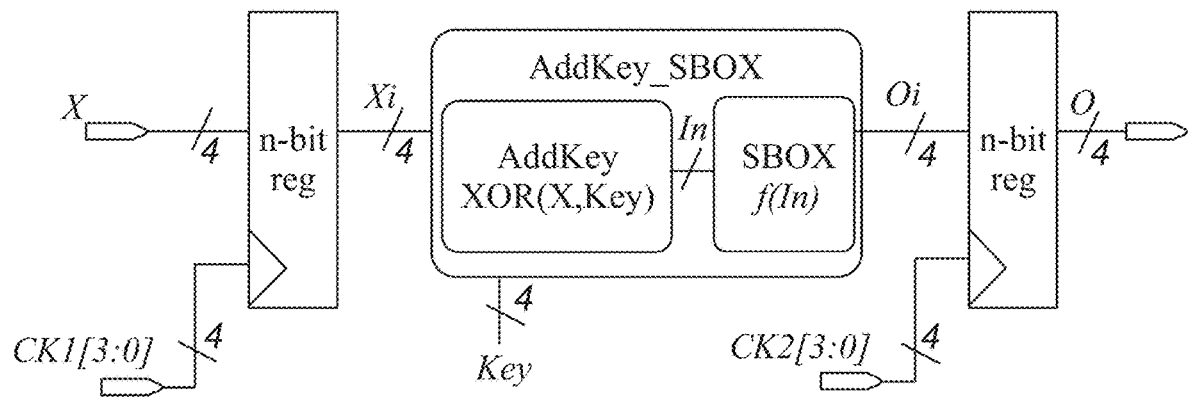
FIG. 7A is a simplified block diagram of a synchronous SBOX design.

The hardware security of pAsynch design was evaluated by examining a single combinational AddKey_SBOX design. This design was added with n-bit sequential elements to sample plaintext and cyphertext (as shown in FIG. 7A). To simplify the exhaustive analog simulations, a small n=4 bit was chosen.

Figure 7B:
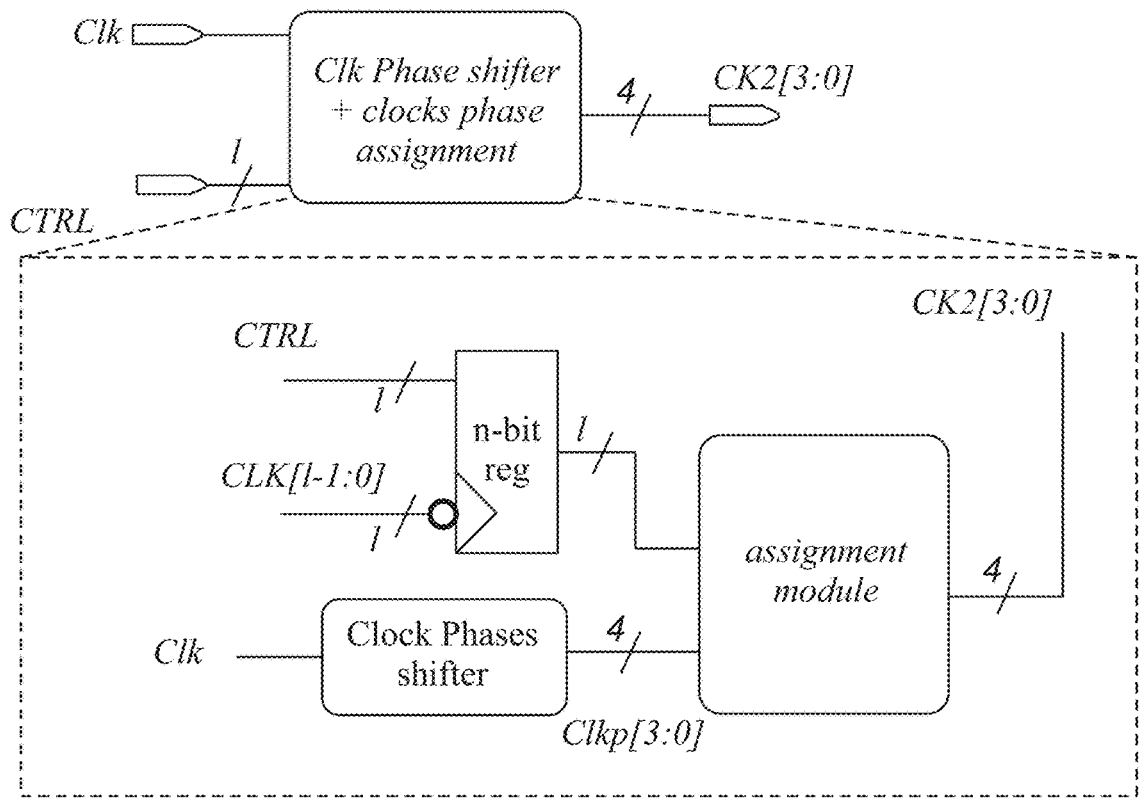
FIG. 7B is a simplified block diagram of a clock phase generation and assignment module, according to exemplary embodiments of the invention.

Reference is now made to FIG. 7B which is a simplified block diagram of a clock phase generation and assignment module, according to exemplary embodiments of the invention. FIG. 7B illustrates the pAsynch design. The CTRL[l−1:0] signal and the assignment module vary for each of the R-, RP- and DP-pAsynch designs. Note that l denotes the size of the CTRL bus which can be assigned with random (Rnd) or data-dependent signals; each design has a different l.

The Clk signal enters an n-clock phase shifter where each phase is shifted by $\Delta \cdot t_{min}$. That is, $$\text{Clkp}[i](t) = \text{Clk}(t + i \cdot \Delta \cdot t_{min})$$

where $\Delta$ is an integer and $t_{min}$ is the delay in units of seconds of the minimum delay element (buffer) of the technology.

Figure 8:
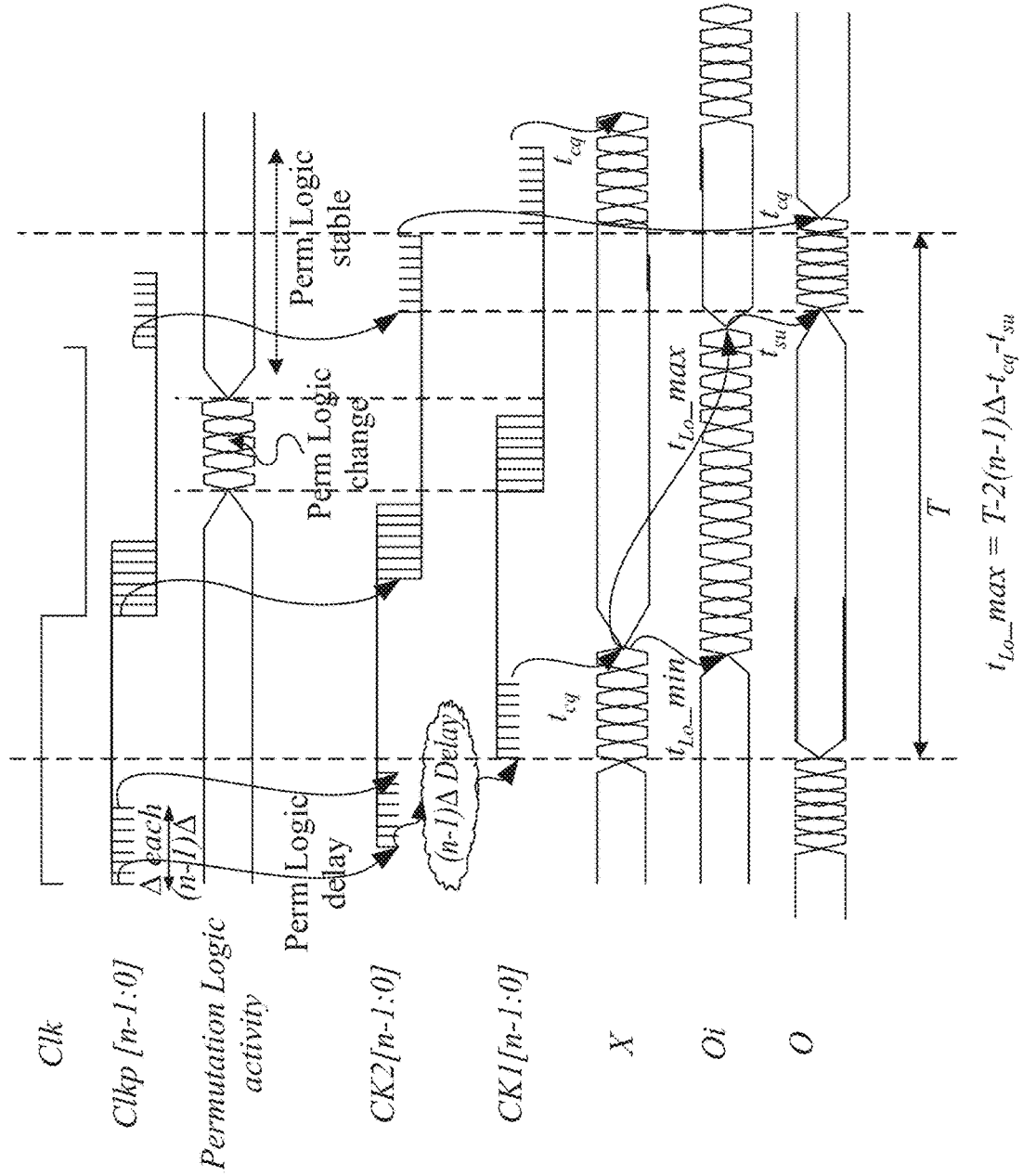
FIG. 8 is a diagram illustrating n-bit design timing diagram and constraints.

In the R-pAsynch design case, the CTRL signal is connected to a Rnd bus which is then sampled in falling clock edges of Clkp[n−1]. The Rnd signals randomly choose which phase to pass to each CK2[i] for the next rising edge. CK2 samples the output layer. The delay unit from Clk to the previous block i is needed to uphold the Hold timing constraints of the combinational AddKey_SBOX block (see FIG. 3). The required delay is $(n-1)\Delta t_{min}$ (in sec.) as shown in FIG. 8. In the random permutation, the RP-pAsynch design, only a l=5 bit Rnd bus is needed because the permutation space size is n!=24 and 25=32 suffices to select from this space.

The data-dependent permutation (DP-pAsynch design) differs from the RP-pAsynch design in that of instead a 5-bit random word we take 5 Data (input and key) dependent bits from internal signals of the SBOX (or the AES) and connect them to the CTRL port. These signals are denoted by $D_i$. Clearly, the phase selection is now input- as well as key-dependent and the attacker cannot possibly know the internal signals that were wired or their functionality easily unless it engages in full reverse engineering of the design.

Note that instead of having the sampling elements of the assignment module synchronized to the same clock phase they can be taken from the preceding module's permuted clocks (CK1). This is done to protect a sophisticated attack scenario which tries to extract information from this sampling layer.

B. Tools and Evaluation Environment

The tools, the simulation environment, as well as the physical and evaluation parameters in this work are follows:

Test bench circuits and tools: Thirty test bench circuits were synthesized by an RTL compiler, placed and routed in a cadence EDI tool and imported into a Cadence Virtuoso environment for analog and analog-noise simulations followed by PA attacks.

Physical Parameters: All designs were implemented using a 65-nm standard CMOS technology process, placed and routed to 9 track pitch physical views and passed post extraction analog simulations. A nominal $V_{DD}$ of 1.1V and system frequency of 0.1 GHz were used. The experiments were conducted with $\Delta$s ranging from 0 which represents the synchronous single-clock design to $\Delta=16$ (more specifically, $\Delta=0, 1, 2, 4, 8$ and 16 were designed). t min was ~50 psec delay.

Validity of the results: All timing (STA) and energy-per-operation results show the worst-case over all process corners and worst temperatures. Area results reflect the physical design outcome. The maximum possible pAsynch logic delay (FIG. 8) is: $t_{Lo\_max} = T - 2(n-1)\Delta - t_{cq} - t_{su}$.

Security worst-case evaluation: The simulation environment in this work simulates optimal conditions for an attacker: it provides high resolution, ideal-noiseless, perfectly synchronized traces from a single stand-alone SBOX module.

Physical model of the consumed current and POIs: An attacker needs a current model to conduct a (non-profiled) attack; alternatively, he needs to collect sufficient statistics to capture the reality of the physically observable circuit in order to profile the currents and perform Bayesian (statistical) attacks. The design bounds the attacker's computational ability to collect and process the measurements into sound statistics since the information is spread in small portions throughout the cycle period. The attacker would in fact need a physical model of the consumed current at the POIs as a starting point for both profiled and non-profiled attacks. In the evaluations, the attacker was provided with the eight best POI's for purposes of simulating the worst possible (although not realistic) scenario.

Physical current model at a single POI: Conventional models implement the Hamming-distance (HD), weight (HW) and their multiplication. The HD*HW and HW models provide information on combinational gate switching, or leakage currents. The HD model extracts information from the activity of sequential elements. HD model based attacks were shown to be more effective than attacks based on other models due to the fact that sequential elements typically have many transistors that dissipate large currents. Unlike HW, the HD model assumes knowledge of the previous data (i.e. previous key and inputs). In practice, this information is not available to attackers which cannot control internal registers. However, in order to simulate the worst scenario, the attacker was provided with this information.

Correlation Ratio as efficiency criterion: The average correlation ratio (CR), $$\text{CR} = \max_{t_1} \rho_{correct\ key}(t_1) / \max_{t_2} \rho_{incorrect\ keys}(t_2)$$

is a security metric used to compare the security level of two designs with respect to a CPA attacker. Note that the pAsynch design methodology is not biased toward a specific key (no ghost peaks); nevertheless, all possible keys were simulated. Specifically, in all simulations there were 16 possible keys and 256 possible input (plaintext) transitions.

Type of CPA attacks: Since the test bench is a 4-bit SBOX, an attacker could launch four different SingleBit attacks, six different DoubleBit attacks, etc. All the possibilities were evaluated and the average and worst case CR were computed. The results shown relate to the average CR over i-bit attack (i=1, ..., 4) unless stated otherwise.

Note that CPA attacks consider the maximal correlation between the measured currents ($I^m$) and the modeled current associated with the hypothesized key (k*) at a single or several points in time, whereas (statistical) templates attacks consider the currents at several points in time, and maximize arg max Pr(I^m|k*). Under a realistic current model and an additive Gaussian random noise, these two tests coincide.

Mutual information (MI) evaluation: The MI reflects the "guessing entropy"—the (average) number of key candidates to test after the side channel attack is $2^{n-MI}$. The MI is computed between the most highly correlated (Pearson) key and the correct key:

$$MI(K_e, K_c) = \sum_{\forall (K_e, K_c)} Pr(K_e, K_c) \cdot \log_2\left(\frac{Pr(K_e, K_c)}{Pr(K_e)Pr(K_c)}\right)$$

Note that this definition relates to a CPA attacker; hence, it differs from the definition in which relates to a Bayesian attacker. This is because in this case, profiling the current traces and deriving sound statistics is not viable (computationally) without making some assumptions about the POIs. However, identifying these POIs turns the Bayesian (profiled) attacker into a non-profiled one.

Leakage estimation and exploitability were evaluated by TVLA (based Welsh's t-test). Since the analysis was based on a high-resolution SPICE simulation a full-scale system could not be simulated. Therefore, the conventional TVLA had to be adjusted to a single module. Table 1 clarifies the adjustments that were made (detailed in Sub-Section IV(E)).

It is clear from the table that the adjusted TVLA environment was significantly in favor of the attacker:

TABLE 1

|  | TVLA | Adjusted TVLA |
| --- | --- | --- |
| Level | System | Single SBOX |
| Platform | Circuit | SPICE simulation |
| Sampling rate | 5x of the BW | 125x of the BW |
| Resolution | At least 8 bits | Infinite |
| Noise | Narrowband (due to bonding, packaging etc.) | Wideband (at the high sampling frequency) |
| Trace length | 128-bit encryption | One iteration (Single clock) |
| Statistical space | Reduced sub-space | All (Key × Input) combinations |
| Synchronization | Must be done | Ideal alignment |
| Preprocessing | Must be done | Not required |

It is noted that the TVLA results depend to a great extent on the quality of the preprocessing.

C. The Clock Period

In intra-cycle time domain hiding, the clock period plays a crucial role. When the combinational elements latest (worst-case) arrival time is before the falling edge of the Clk (the master latch becomes transparent at the falling edge and passes the data) the system is more sensitive to power analysis as elaborated next.

Figure 9A:
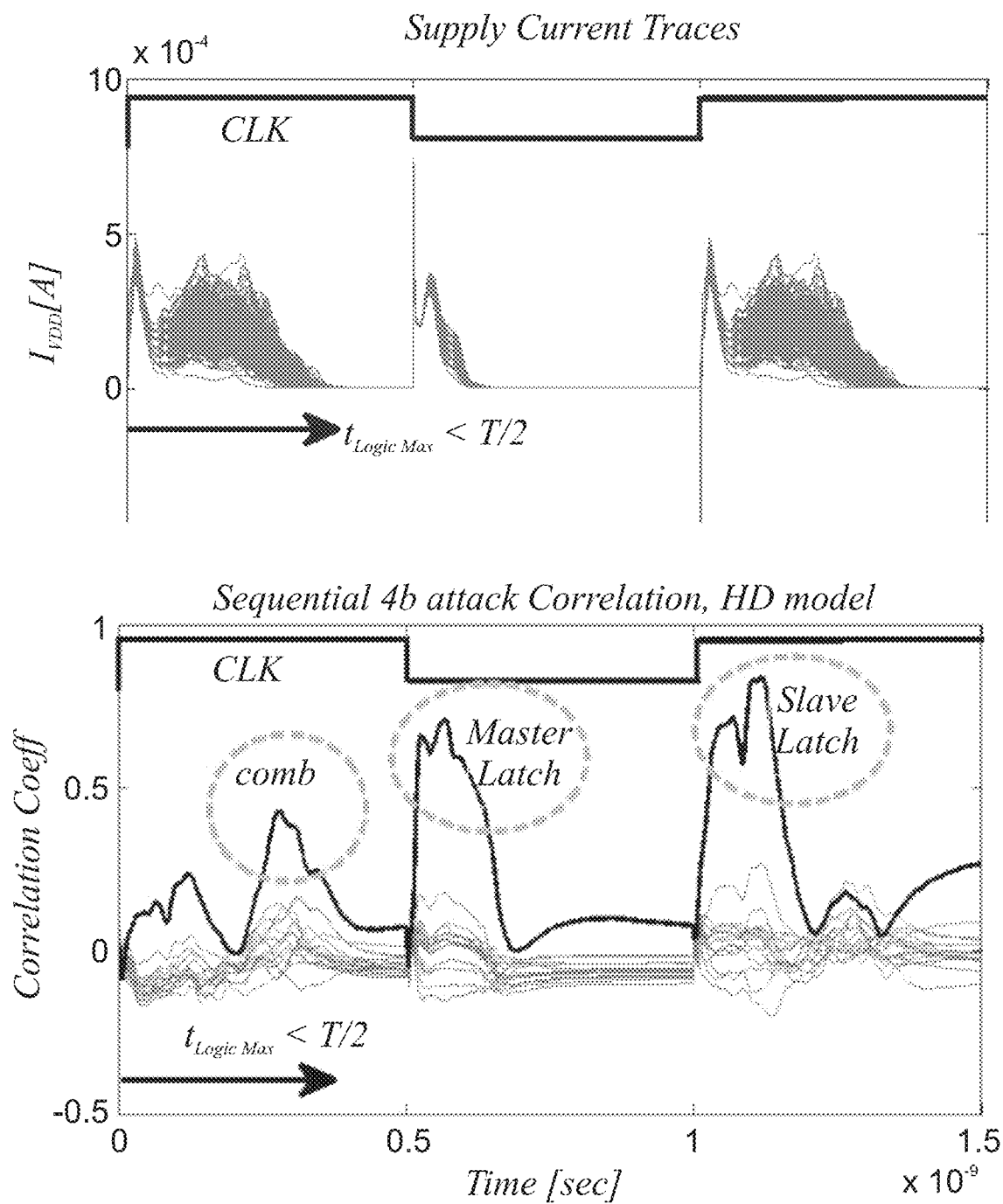
FIG. 9A is a correlation plot of IVDD current and 4-bit Multi-bit attack correlation for the worst-case logic delay that arrives before the falling Clk edge.
Figure 9B:
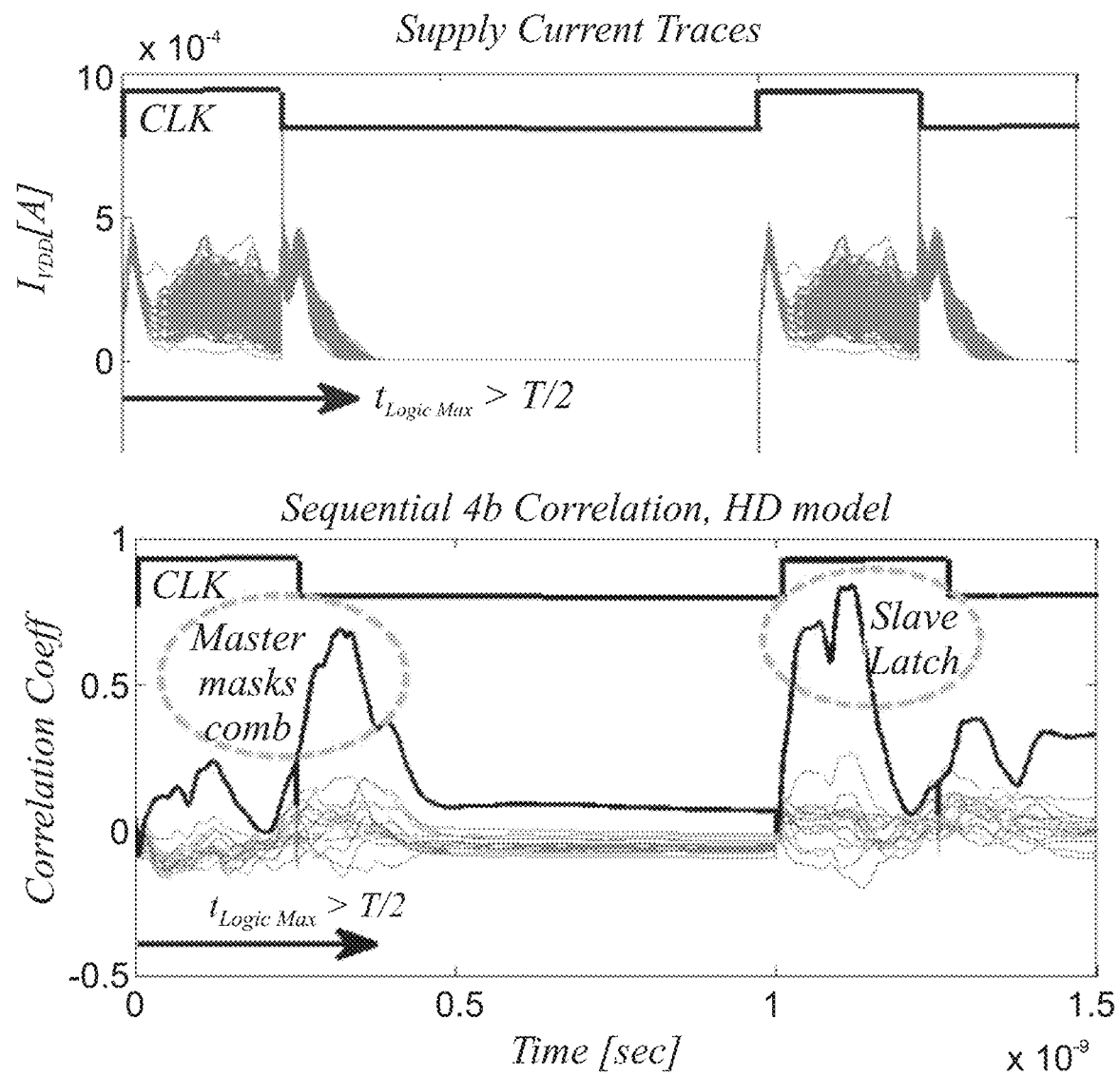
FIG. 9B is a correlation plot of IVDD current and 4-bit Multi-bit attack correlation for the worst-case logic delay that arrives after the falling Clk edge.

FIGS. 9A-B show two correlation plots: in FIG. 9A the combinational output's latest arrival time is before the falling Clk edge and in FIG. 9B it arrives after the falling Clk edge. The upper plot of FIG. 9A shows the voltage supply current traces along with a schematic clock signal to illustrate that the current of the combinational part stabilizes before the clock's falling edge (denoted by $T_{logic\_max} < T/2$). In the lower part of the figure, the correlation plot shows how a correlation clearly appears in three locations: where combinational outputs arrive, immediately after the falling clock edge and after the rising clock edge. In FIG. 9B the combinational outputs arrive after the falling clock edge when the master latch is transparent and in this case both the combinational correlation and the falling edge correlations are combined and manifest only one smaller correlation peak. From this point on, all the circuits in this work were analyzed under security worst-case conditions where logic stabilization occurs before the falling clock edge. ps IV. Simulation Results—Active Region In this section, simulation results are presented while focusing on the Active region with respect to:

Immunity to CPA attacks:
It is shown that a) the RP-Asynch (also denoted RP) and DP-Asynch (also denoted DP) designs provide higher immunity to CPA (as a function of Δ), and b) the immunity of the DP design does not degrade with the increase in the number of collected current traces.

Immunity to pre-processing and filtering techniques
Low Mutual Information (MI) values:
It is shown that the amount of information that an attacker can gather about the correct key by correlation analysis is significantly smaller in the DP design than in conventional CMOS or random permutation designs.

T-test results: It is shown that the current traces carry less information.

Implementation tradeoffs.

We start by analyzing the immunity to CPA attacks. First the impact of the size of Δ is analyzed and then the effect of more statistics.

A. CPA Immunity: The Impact of the Value of Δ

Figure 10:
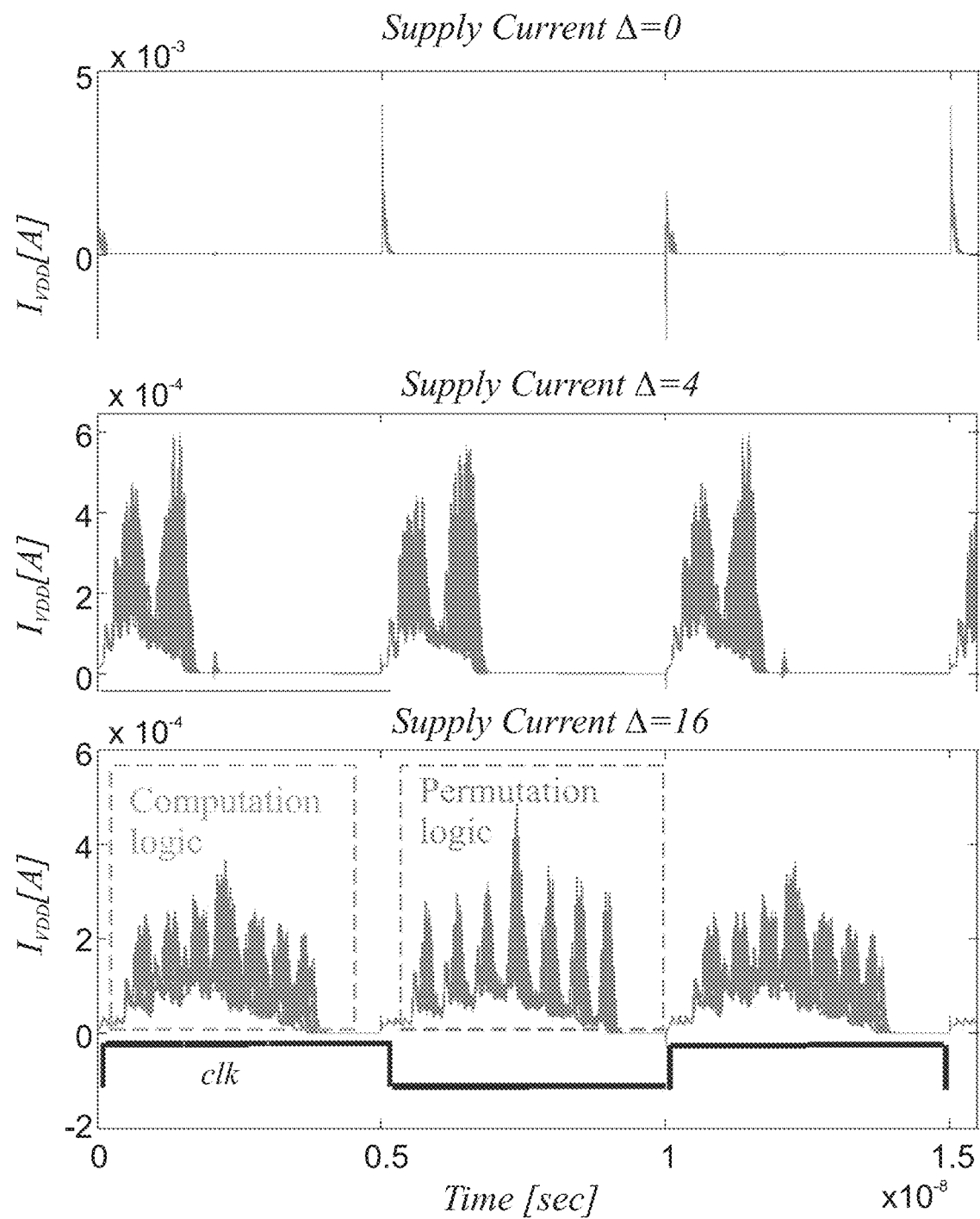
FIG. 10 shows power supply current IVDD dissipation vs. time.

Examining the current waveforms of the designs:
FIG. 10 shows the current dissipation vs. time (the time axis is shared for all plots) for Δ=0, 4, 16. Note that the current magnitude is 10-fold smaller for Δ>0 which indicates that the energy gain is not proportional to the width of the current envelope. Clearly, the current waveform is similar for all pAsynch flavors.

The phased clock impact on the current waveforms is clear in the lower plot, where Δ=16. We distinguish (when Clk is high) 4 phases of CK1 following the 4 phases of CK2. The currents in the high clk phase are mainly due to the encryption logic, and the currents in the clk low phase are mainly due to clock phase permutation logic.

Figure 11A:
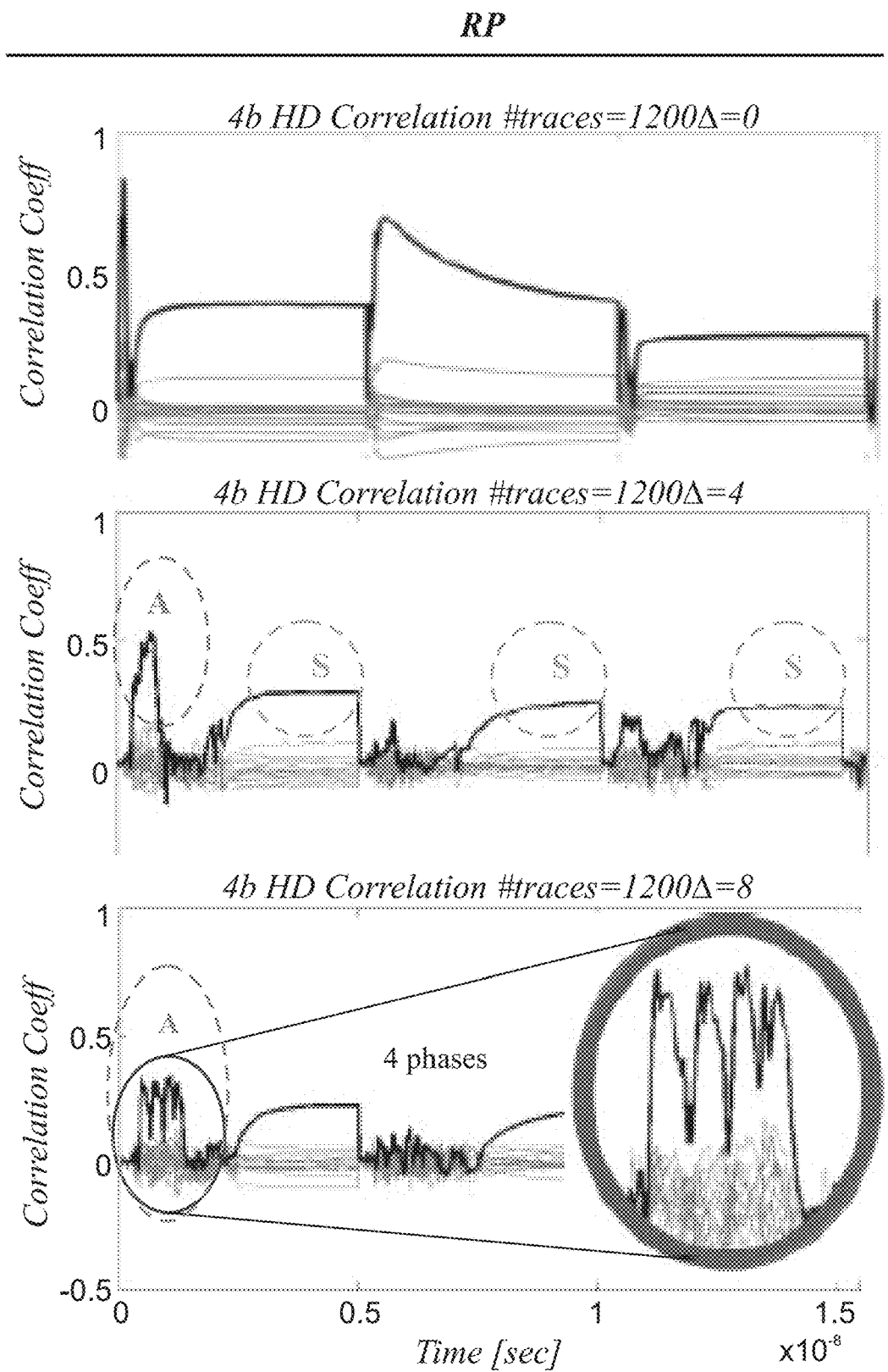
FIG. 11A shows multi-bit HD attack correlations for the RP design.
Figure 11B:
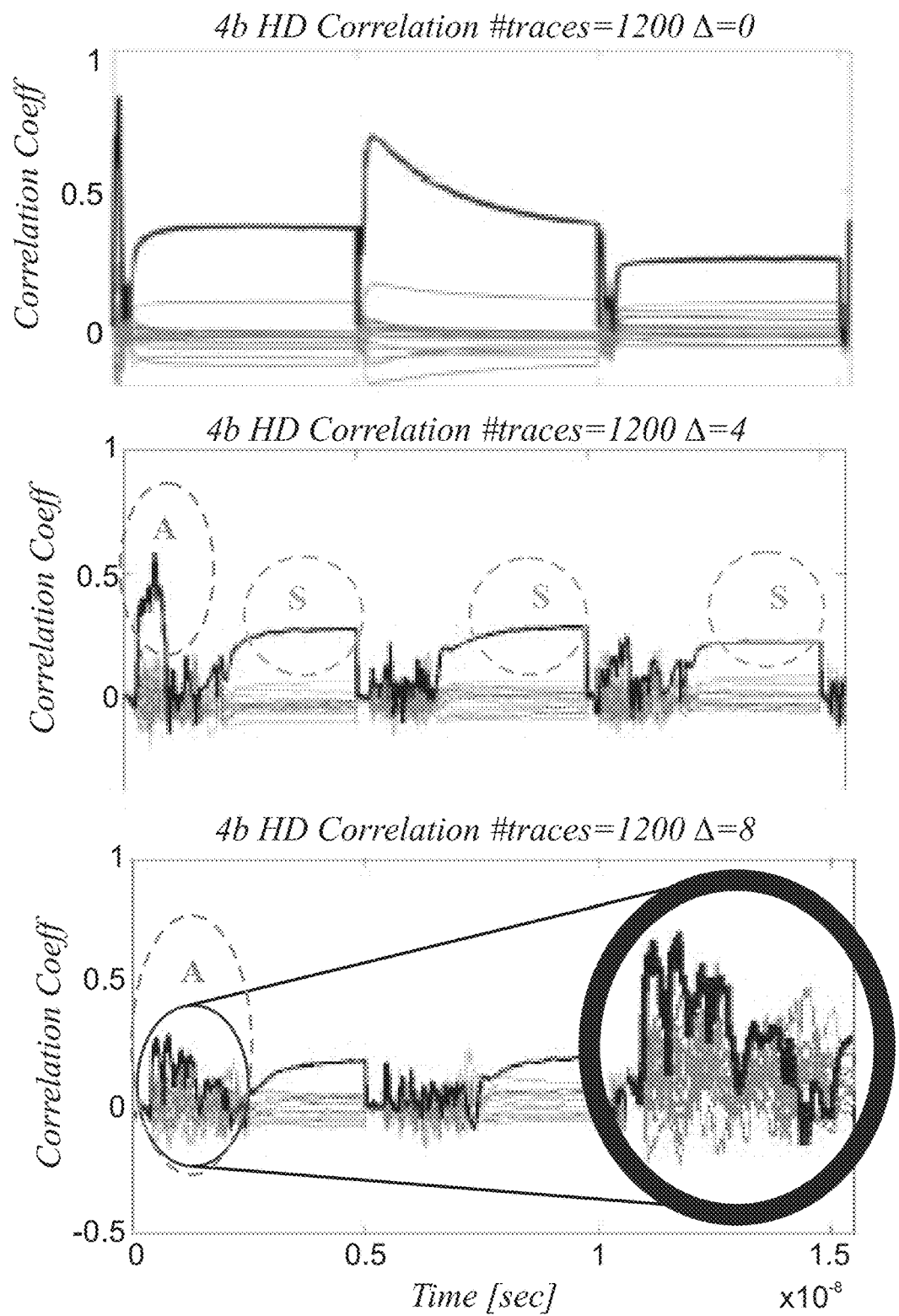
FIG. 11B shows multi-bit HD attack correlations for the DP design.

The correlation values (CR) of the RP and DP designs for an exemplary key for Multi-bit HD attacks when Δ=0, 4, 8, are shown in Figs.11A-B. Note that the average CR values (over all the keys) are reported in Table 2. It is clear from FIGS. 11A-B that:

a) As Δ increases, the correlation values significantly/rapidly decrease.
b) There are four different correlation regions: two Active (A) regions where the system is dynamic and transitions occur, and two Steady (S) regions where the system is static and leakage currents flow. The figures show that in both the RP and DP designs whenever the system is Steady the correct key correlation is distinguishable, although with very low correlation values (0.2-0.3). This is discussed in Section V.

Random timing permutations do not help increase security: FIG. 11A reveals the weakness of the RP design, for Δ=8 and that for large enough statistics the correlation in the active regions shows 4 distinct phases. This, however, does not happen with the DP design (as indicated by FIG. 11B). In fact, this design provides almost full protection even with Δ=8 (since the CR is not far from 1). More results for larger Δs are given in the next subsection.

B. CPA Immunity: Do More Statistics Improve the Attack Success Ratio?

Figure 12A:
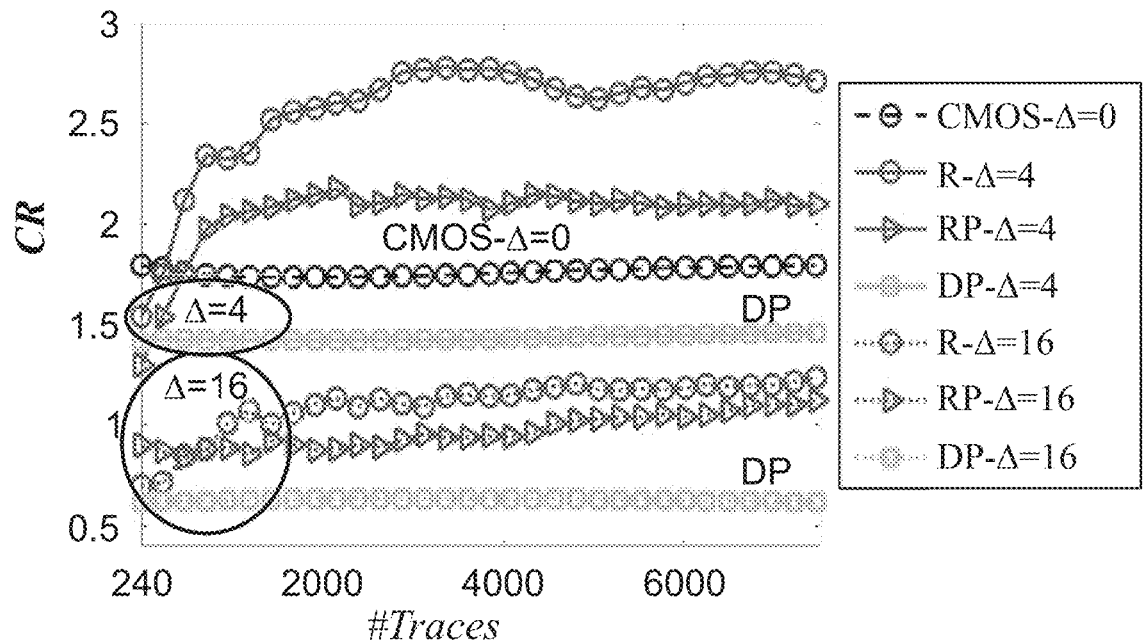
FIGS. 12A-12B show the CR of a single-bit and 4 multi-bit attacks respectively on R, RP, DP and unprotected circuit designs.
Figure 12B:
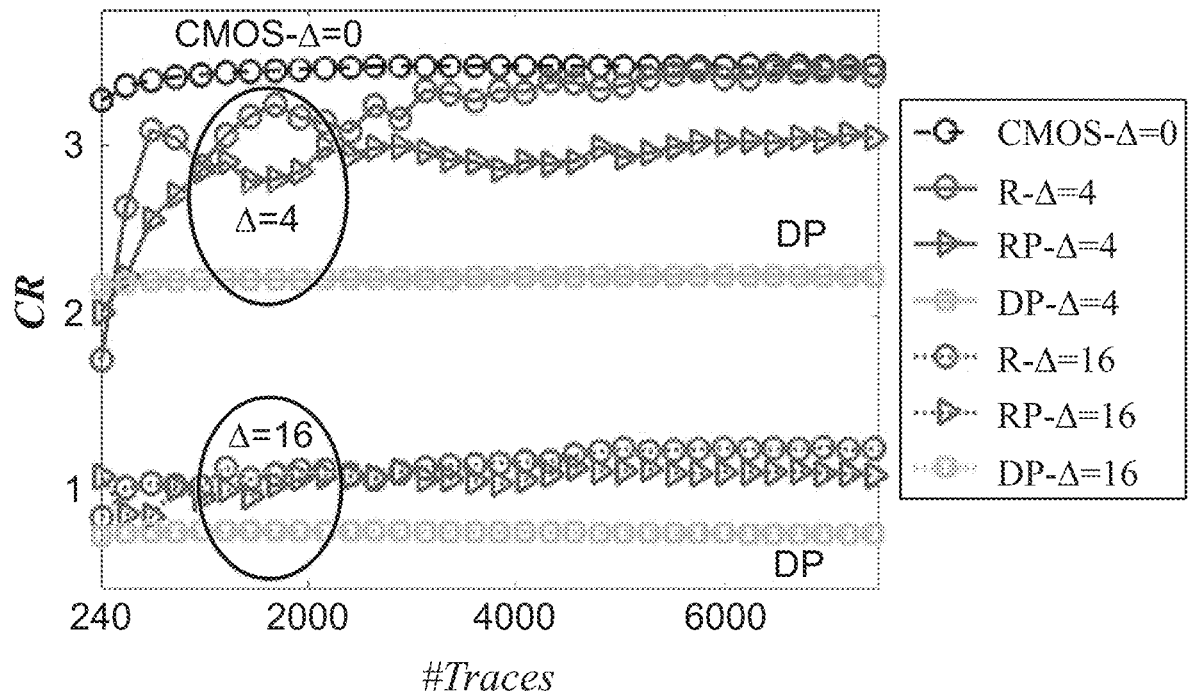

Next, it was explored whether increasing the number of recorded current traces would deteriorate the effectiveness of the solution. FIGS. 12A-12B show the CR (for an exemplary key 11) of a single-bit and 4 multi-bit attacks on the three designs with Δ=4, Δ=16 and the unprotected design (Δ=0).

It is clear from the figure that increasing the statistics set of the DP design does not increase the CR because once the phases are data-dependently assigned, statistics cannot extract more information. FIGS. 12A-12B also show that in designs that employ randomness (R and RP) the CR increases with the size of the statistical set. As expected, the CR of the RP design lies between the R and DP designs. From the graphs, the DP design with Δ=4 is not sufficiently secure (CR>1) whereas Δ=16 provides immunity. By contrast, the R and RP designs remain sensitive even with Δ=16, and the CR keeps rising when increasing the statistics.

The average CR results of the DP design with Δ=16 is 1.02 whereas the unprotected CMOS design CR was 3.5 (see Table 2). Recall that these results were obtained in a noiseless, perfectly synchronized and stand-alone environment. In real-life, the DP design is more secure.

C. The Impact of Pre-processing and Filtering

In real-life systems, the on-chip power grid forms a distributed network of resistive and capacitive elements which filter the high frequencies of the power signal. In addition, sensitive measurement equipment such as active noise-reduction current probes add another layer of filtering. The filtering, both the physical and the preprocessing, can be modeled as a Hamming window.

Note that preprocessing by a Hamming window is twofold: on one hand, it accumulates the energy of the desired signal when spread over the clock cycle and on the other it accumulates undesired noise.

In general, the measured current of the pAsynch data-dependent methodology can be modeled by:

$$I^m(t) = I^h(t \mid k_{curr}, x_{curr}, k_{prev}, x_{prev}) + n_g(t) + n_d(t \mid k_{curr}, x_{curr}, k_{prev}, x_{prev})$$

That is, the instantaneous current is the sum of:

(a) the hypothesized current which is dissipated in time samples which depend on the previous and current data; i.e., secret keys and inputs (plaintexts), (b) normal Gaussian noise due to physical factors, $n_g$, and (c) switching noise, that depends on the previous and current data, $n_d$.

It is typically assumed that a CPA attacker cannot model $n_d$, and hence cannot attack it; rather, the known functionality of the cryptographic device, the output logic, is attacked. Thus, $n_d$ cannot be averaged out or removed with statistics since it is deterministic.

In the DP design the signal is spread across the clock cycle assimilated within the dependent noise ($n_d$); therefore, the CR depends on window width: although up to a certain point, the CR may increase, it will definitely decrease as the width increases and more noise is collected. Finally, and perhaps most importantly, as Δ increases, the consumed energy increases (since the circuit has time to stabilize on n different internal states) and therefore $n_d$ also increases. Simulation results confirmed the above observations: 10,000 traces were filtered prior to the CPA attack procedure with a Hamming window of 10 psec (all-pass filter) to 1.5T (T=10 nsec).

Figure 13:
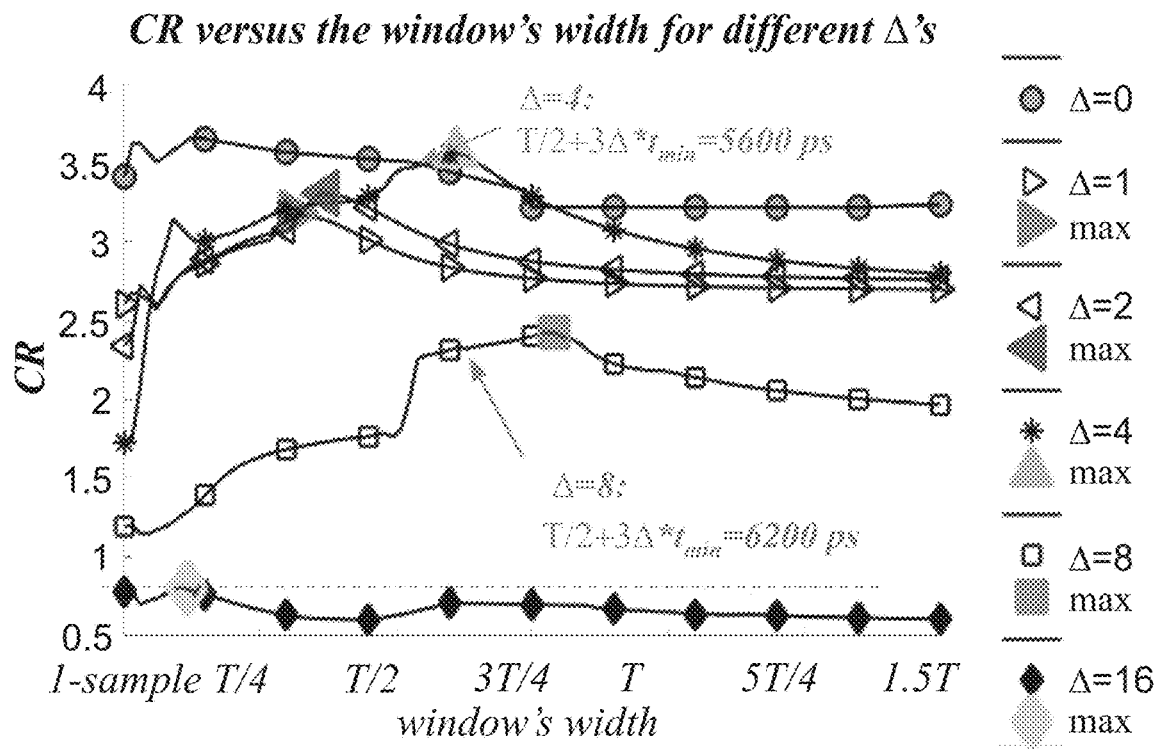
FIG. 13 shows the CR results vs. the filter width for different $\Delta$'s.

FIG. 13 shows the CR results vs. the filter width for different Δ's. For Δ=4 and 8 the optimal window widths are very close to $T/2+3\Delta^* t_{min}$. At these widths, all the information from both the rising edges and the falling edges of the clock phases is captured. It is very important to note that with sufficiently large Δ, filtering is useless, as the signal information is well hid and spreads within the noise information.

D. Information Leakage—Mutual Information

The Mutual Information (MI) between the evaluated key (correlation evaluator), Ke, and the correct key (Kc) was computed over the Active region of the current traces. As shown next, the MI gap between the pAsynch approach and randomization based temporal hiding or unprotected CMOS designs was significant.

Figure 14:
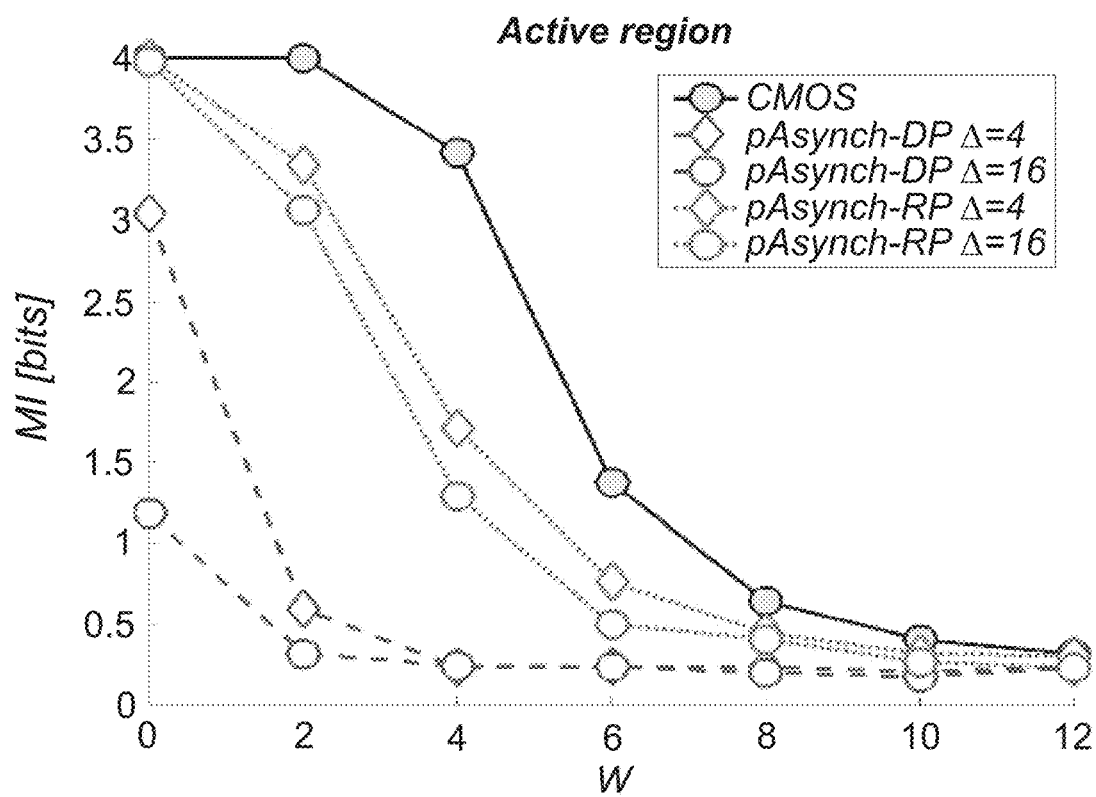
FIG. 14 shows a Mutual Information analysis, Active region.
Figure 15A:
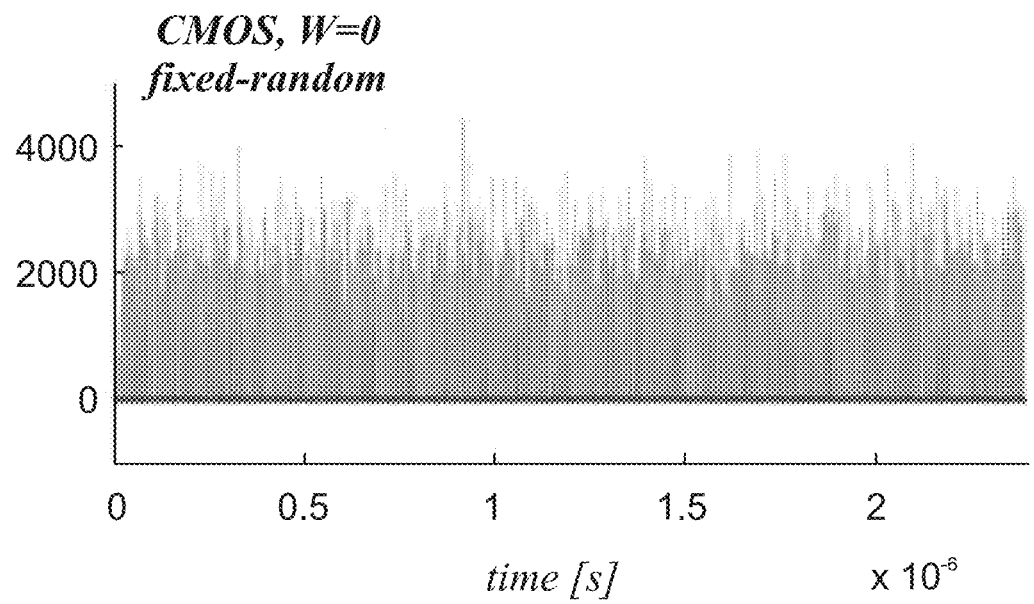
FIGS. 15A-15D show four fixed vs. random and random vs. random t-test results.
Figure 15B:
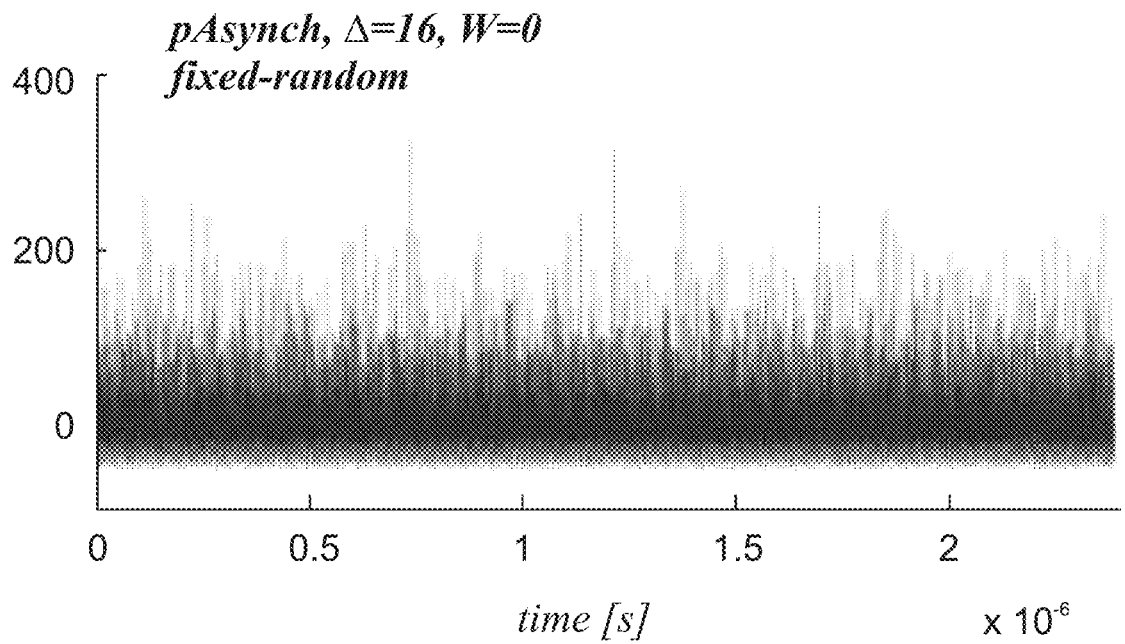
Figure 15C:
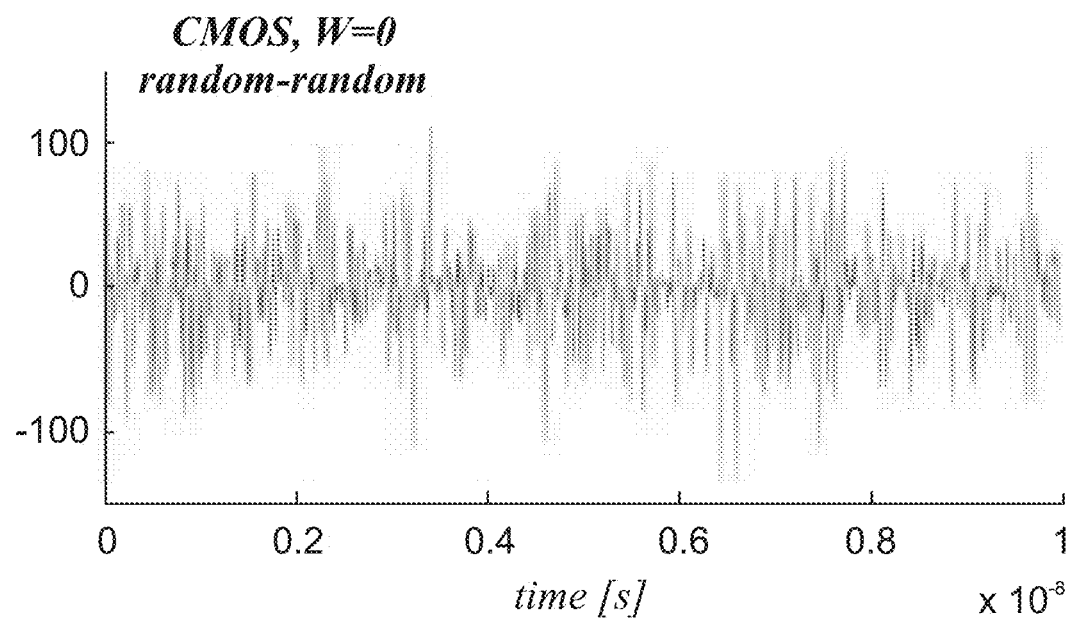
Figure 15D:
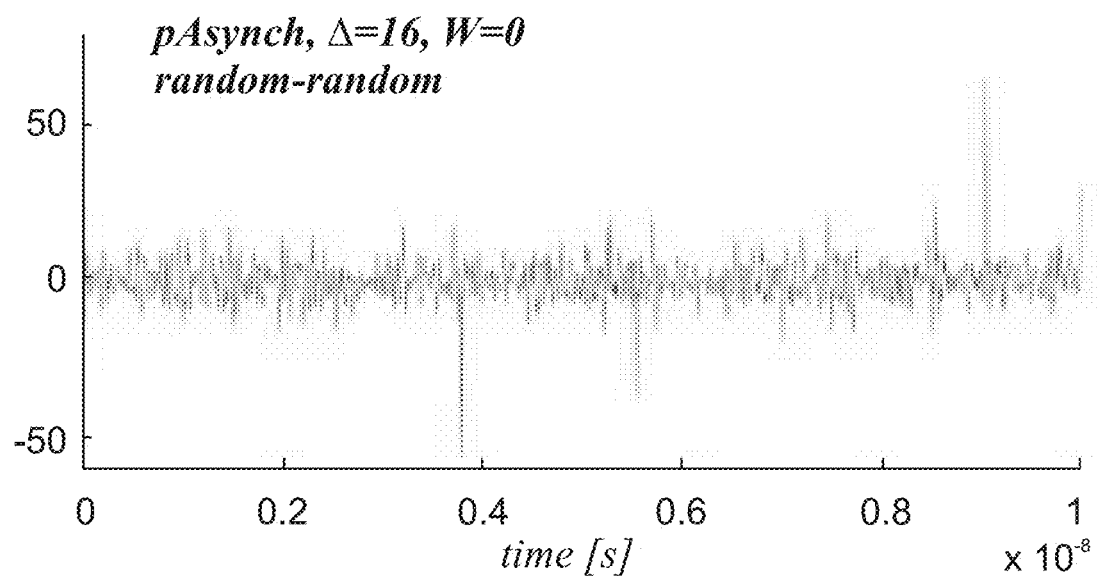

The supply current, $I_{V_{DD}}(t)$, was measured over 200 transient-noise simulations for each possible key and each possible input transition, to observe the switching noise and inherent thermal (ng) noise in the circuits and provide a meaningful statistical dataset. Noise was emulated through physical transient noise simulations with noise $F_{max} \times 8$ the design bandwidth. In addition, architectural noise (which mimics W SBOX units that operate in parallel) was added to the signal. In other words, the simulated current incorporated the following currents:

$$I_{V_{DD}}(t) = (I_{noiseless,DUA}(t) + n_{g,DUA}(t)) + W \cdot ((I_{noiseless,d}(t) + n_{g,d}(t)))$$

where d stands for a dummy module and DUT the module under test. The mutual information values for different values of Ws are shown in FIG. 14. As expected, as the number of additional modules (W) increased, the amount of information that could be learned decreased.

The unprotected CMOS design is vulnerable since all four bits of the secret key can be learned by a correlation attack (MI=4). The random based flavors are also highly sensitive. The DP-pAsynch reveals only 1.2 bits out of the 4 bit secret key (in a noiseless environment) when Δ=16. The most interesting observation is that with as little as W=2 the information decreases to 0.3, whereas the random based and CMOS designs are still close to 4 bits.

E. Information Leakage Detection and Exploitation

Welch's (two-tailed) t-test (and CRI's TVLA methodology) were calculated on two input sequences (S0 and S1). The sequences were chosen to test fixed vs. random and random vs. random input sequences (denoted in the figures by fixed-random and random-random) to detect nonspecific leakages:

$$t = (\mu_{S_0} - \mu_{S_1}) / \sqrt{\sigma_{S_0}^2 / |S_0| + \sigma_{S_1}^2 / |S_1|}$$

The random sequence was chosen to provide all possible input transitions with a fixed key (and tested for all keys). These random sequences were produced by injecting the $\{0\}^n$ vector to the AddKeySBOX and iteratively inserting the previous stage output to the module. In the 4-bit SBOX design this required $(2^n)^3 = 4096$ clock cycles. The fixed sequences were chosen to go through all input sequences with the same fixed key (over all the keys) at the same cycles at which they were used in the random sequence.

In general, t-tests are calculated on a set of acquisitions to examine: a) a fixed message versus a random message with a fixed key, or b) a fixed cryptographic key versus a random cryptographic key with a fixed or random message. In this stand-alone SBOX scenario, the role of key and input is symmetric. Therefore, this examination methodology was not biased.

The sampling rate was ×125 the bandwidth of the design (the NIST recommendation is to use a sample rate of ×5; therefore, the t-test could find even smaller intra clock-cycle leakages). The t-tests were run with a different number of traces (denoted by #tr) and different levels of architectural noise (W).

Figure 16A:
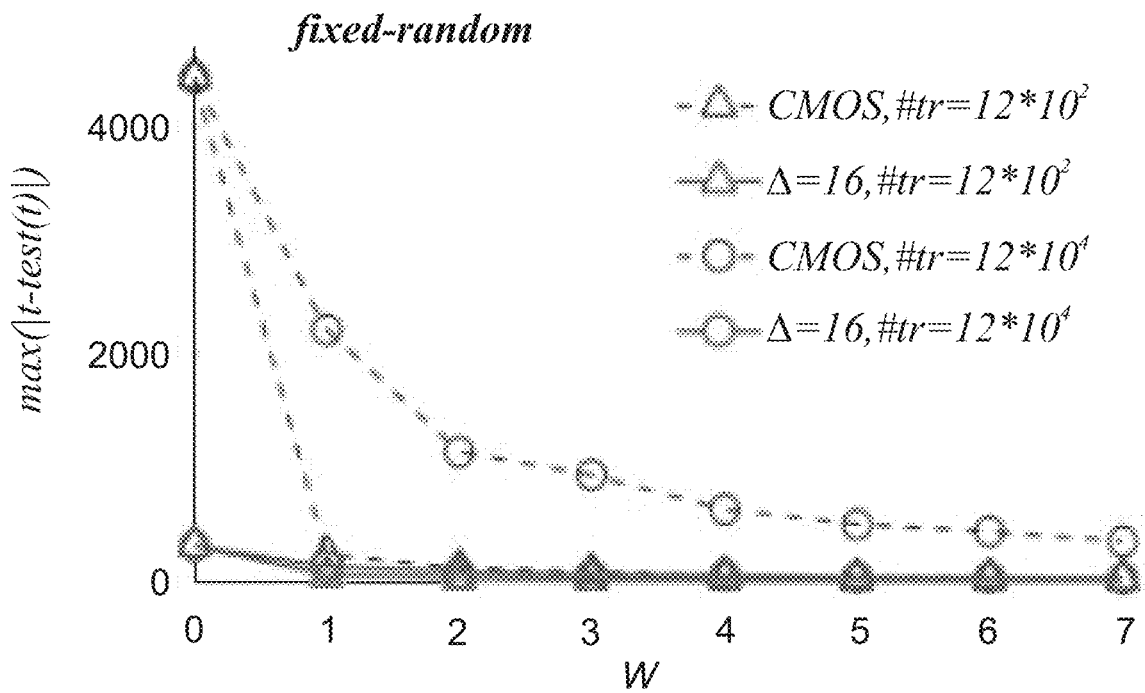
FIGS. 16A-16C show the maximal absolute values of the t-test results.
Figure 16B:
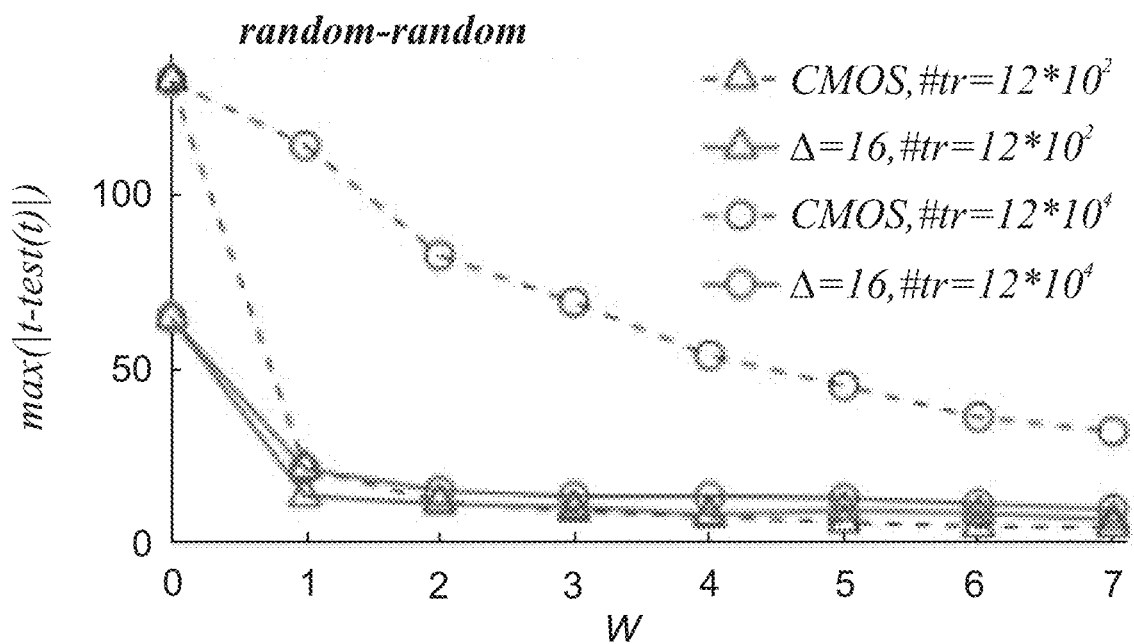
Figure 16C:
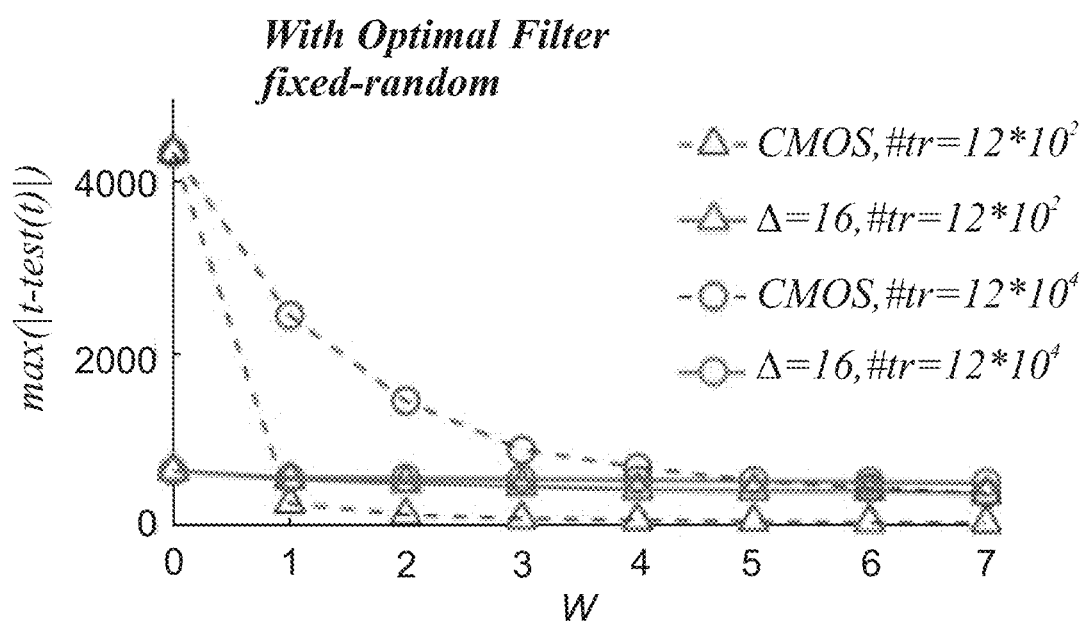

Four exemplary fixed vs. random and random vs. random t-test results are shown in FIGS. 15A-D and the maximal absolute values of the t-test results are shown in FIGS. 16A-C. The fixed vs. random results in FIGS. 15A-15B of the CMOS and the pAsynch designs, respectively, clearly show positively biased values. This is due to the non-symmetric distribution (per time sample) of the current amplitude. Note that on the y-axis scale, the pAsynch results are 10-fold smaller than the CMOS. The random vs. random results are clearly symmetrical because the sets were randomly chosen from the same population.

The values in FIGS. 16A-C reflect the maximum absolute values over time. As expected, the fixed vs. random results (FIG. 16A) were much higher than the random vs. random results (FIG. 16B). In FIG. 16C the tests were performed on the filtered traces. A Hamming window with optimal width was used (see Section IV(C)). Figures 16A-C show that the t-values of the pAsynch design were smaller than those for the CMOS design. As expected, because the temporal data dependency of the pAsynch design is deterministic, it was detected by the test. However, though present, this information is very hard to exploit by a model-based attack. (The maximum absolute value of the fixed vs. random reflects the worst difference of one vector from the mean of all vectors. The random vs. random results are much smaller because they compute the means of independent sets from the same population.)

F. Design Tradeoffs

In general, security has costs in terms of power, area and performance. The area utilization of the pAsynch design is at most ×1.5 (for $\Delta=16$) of an unprotected CMOS design. This cost is significantly smaller than the cost of high-level methods such as Threshold-Implementation (TI). The area overhead of a 1st order TI is ×4 as compared to an unprotected design. For higher orders TIs it increases rapidly; e.g., for a 2nd order TI which requires a minimum of 5 input shares and 10 output shares the cost is more than ×7.

The electrical metrics of the pAsynch design reported in Table 2 were evaluated for the protected PD design, including the CMOS design ($\Delta=0$). The table presents the system cost in terms of Place-and-Route Area utilization, the average energy per operation from analog Cadence virtuoso measurements, the worst-case computation time, the average CR over all keys and the Mutual Information. Table 2 emphasizes that the better the security the higher the cost of the electrical metrics per design. Note that these results include the Steady state amplitude hiding circuitry detailed in Sub-section II(B).

TABLE 2

| Design | Area [um$^2$] | Delay [10 ps] | Average (Energy/op) [fJ] | Av. CR | MI [b] |
|---|---|---|---|---|---|
| $\Delta = 0$ | 133 | 80 | 1.45E+02 | 3.5 | 4 |
| DP, $\Delta = 1$ | 173.75 | 102 | 3.57E+02 | 2.5 | 3.7 |
| DP, $\Delta = 2$ | 175.75 | 123 | 4.00E+02 | 2 | 3.4 |
| DP, $\Delta = 4$ | 177.75 | 165 | 4.46E+02 | 1.5 | 3 |

TABLE 2-continued

| Design | Area [um$^2$] | Delay [10 ps] | Average (Energy/op) [fJ] | Av. CR | MI [b] |
|---|---|---|---|---|---|
| DP, $\Delta = 8$ | 181.75 | 226 | 4.90E+02 | 1.2 | 1.4 |
| DP, $\Delta = 16$ | 191.75 | 312 | 5.41E+02 | 1.02 | 1.2 |

V. Simulation Results—Steady Region

As clearly shown in FIG. 11A the pAsynch design effectively hides the information leakage of the dynamic region; however, the Steady-state is still exposed. This section shows how the amplitude hiding mechanism presented in Section II(A) reduces the information leakage in this region as well.

Figure 17:
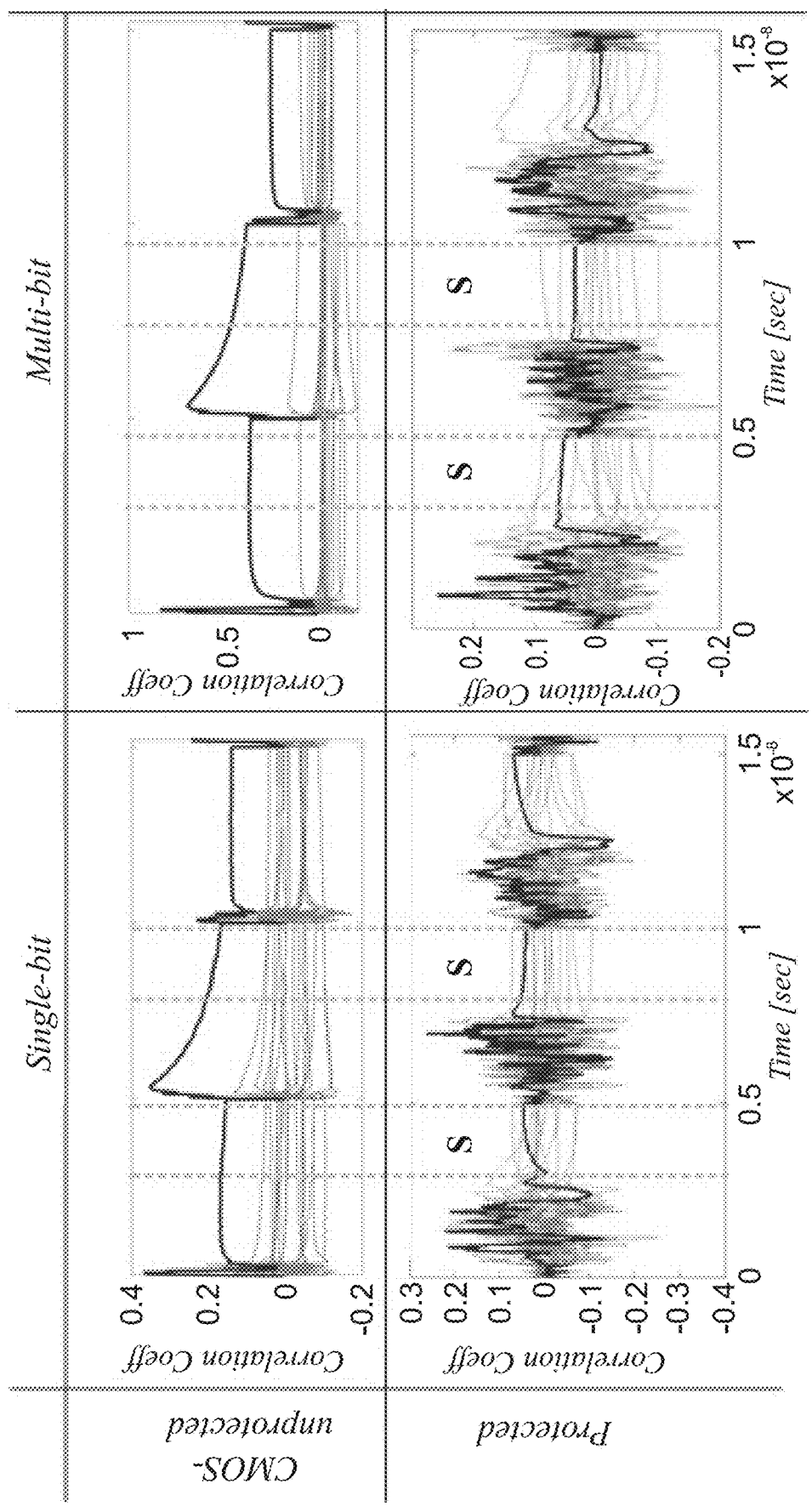
FIG. 17 shows the Single- and Multi-bit correlations of the protected design and of an unprotected CMOS design.

The hardware security of the amplitude hiding mechanism was evaluated by the same testing environment used for the Active region discussed above. Each sequential element was added with the always-on power gates mechanism. The Single- and Multi-bit correlations of the protected design as well as an unprotected CMOS design are shown in FIG. 17. Their respective correlation ratios (CR) values were 0.65 and 0.67 in the Steady-state (S), for secret key 11. Clearly, both the Single- and Multi-bit attacks were protected in the Static regions, as compared to the results of the unprotected CMOS design; this test was carried out on all the possible secret keys showing high immunity.

Figure 18:
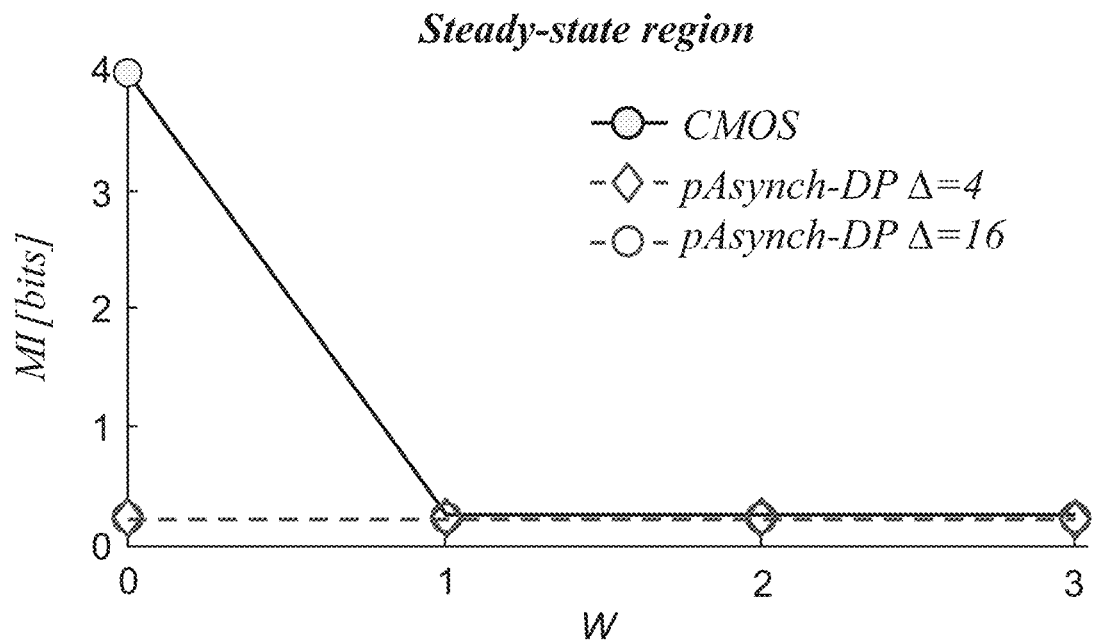
FIG. 18 shows a Mutual Information analysis, Steady region.

Similar to the procedure described above, the non-profiled Mutual Information (MI) was computed over the Steady region as shown in FIG. 18. As expected, as the number of additional noisy modules increased, the amount of information that could be learned decreased. Clearly, the unprotected CMOS design was inherently vulnerable in a noiseless environment (W=0), since MI=4 means that all four bits of the secret key could be learned by a correlation attack. The Steady-state protected design revealed only 0.2 bits out of the 4 bit secret keys indifferent to W. Note that with as little as W=1, the unprotected design MI decreased to ~0.2 which shows how small the information leakage is (and the amplitude and amplitude differences in the Steady state).

Figure 19A:
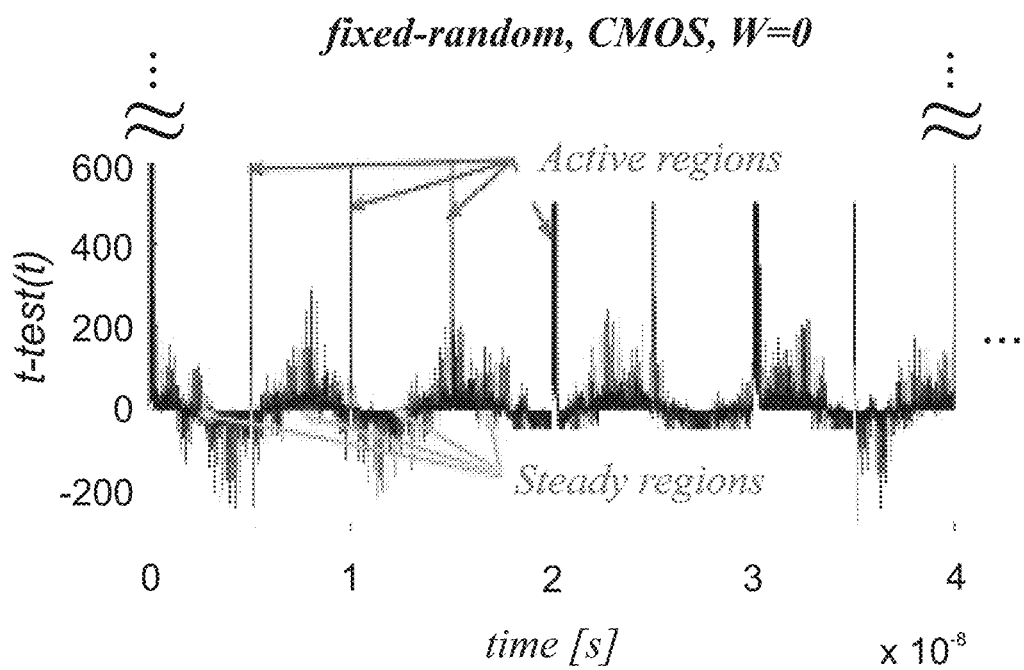
FIGS. 19A-19C show fixed vs. random and random vs. random t-test results over the steady-state region.
Figure 19B:
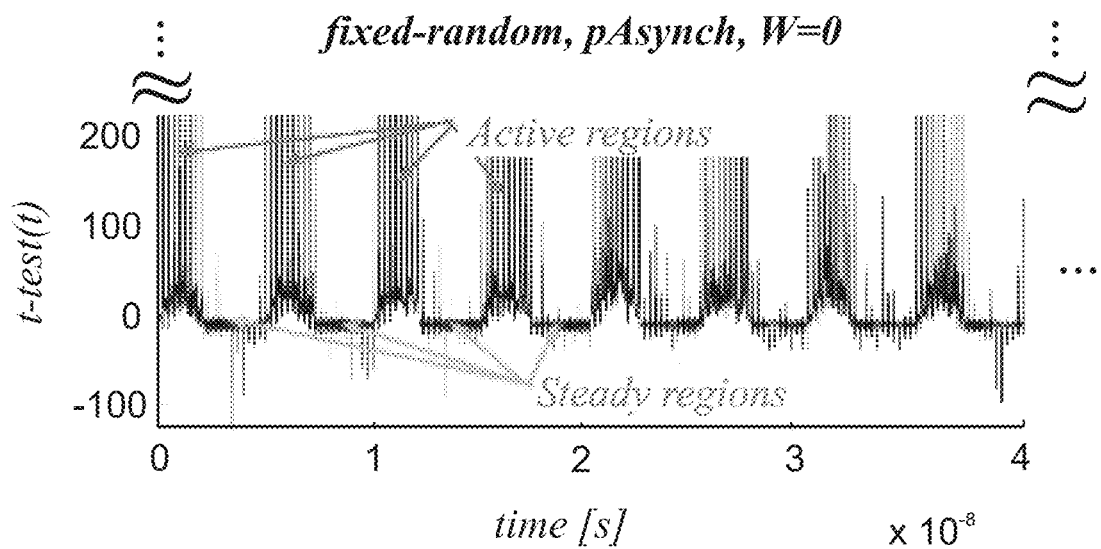
Figure 19C:
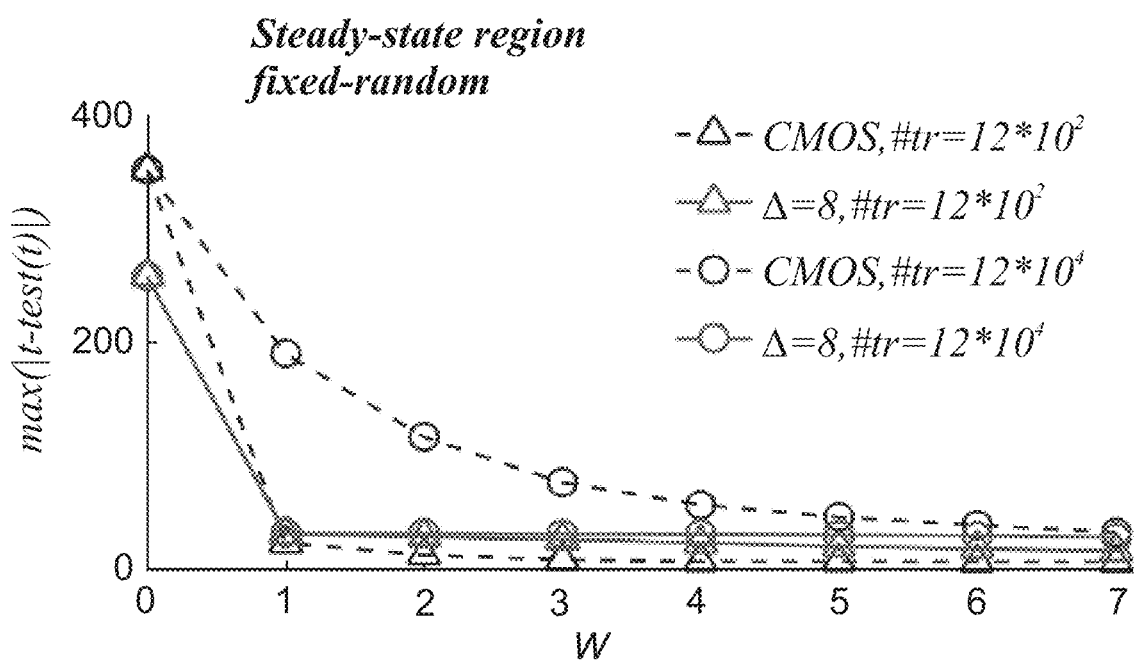

Two exemplary fixed vs. random t-test results over time are shown in FIGS. 19A-19B. The Steady and Active regions are highlighted in the figures. The maximal absolute values of the t-tests results are shown in FIG. 19C. Supporting the results of the correlation tests from 19A-19B above, they show how little information exists in the Steady states compared to the Active states.

The fixed vs. random results (FIG. 19C) showed there was less information than the CMOS designs (more importantly for W=0). In addition, as discussed in the previous section, though present, this information is very hard to exploit by a model-based attack.

In conclusion, the power supply current leaks information about internal signals. This information can be utilized maliciously to obtain secret information. As demonstrated above, the Pseudo-Asynchronous (pAsynch) design makes the exploitation of this information much harder. The pAsynch design provides a low-cost solution (relative to architectural or logic based solutions) for this problem. The pAsynch style combines the security advantages of asynchronous circuits with the ease of synchronous circuit design. It provides intra-cycle hiding. The results demonstrate effective hiding in both the Active-region and Steady-region.

VI. Steady State Leakage of Sequential Devices

Leakage Power Analysis (LPA) attacks are a class of attacks that aim to extract correlative information from the leakage currents of gates and transistors in the Steady state. An LPA attack is a powerful one performed by an attacker that formulates hypotheses on the logical values of gate inputs. It has been shown that leakage currents in CMOS logic depend on a function of the Hamming Weight (HW) of the gate inputs.

One common capability assumption is that the ASIC attacker does not have the exact netlist of the design and can only hypothesize the values of the output nodes (these are known from the cryptographic standard). These combinational outputs that an attacker can hypothesize without knowing anything about specific details of the design serve as inputs to the synchronous elements. The fact that the attacker cannot determine the functionality of the internal nodes (gate inputs) and the exact gates they are made of makes LPA attacks on the combinational parts much harder than on the sequential part. In addition, as compared to sequential elements which have a single functionality (and hence a single leakage model), different combinational gates have many different leakage models. Furthermore, sequential elements dissipate larger currents because they are typically constructed from more transistors.

Figure 20:
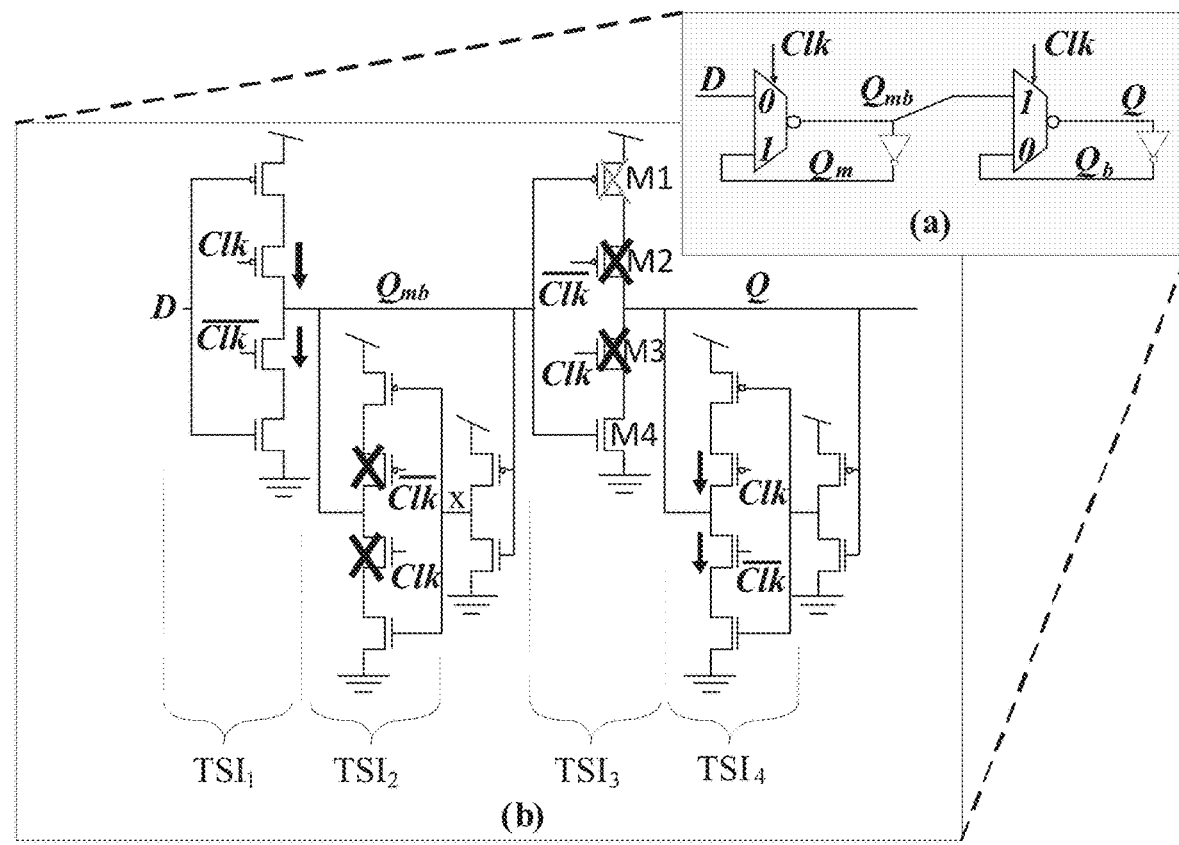
FIG. 20 shows a D Flip-Flop in abstract and transistor level views.

A scheme of a Master Slave D-Flip Flop (D-FF) is shown in the upper right corner of FIG. 20. It is constructed of a Master (transparent in '0')-Slave (transparent in '1') Latch pair. The D input enters the first latch and therefore affects its leakage as well as the internal node voltage (Qmb). The Q node impacts one input of the second MUX (due to the cross-coupling nature of memory elements) and the internal node Qmb enters the other input. Clearly, sequential device leakage currents do not depend solely on the input (D) or solely on the output (Q) of the cell. This provides one indication that the HW of the input (as is typically assumed when modelling combinational gate leakage currents) is less suitable to model the leakage of sequential elements.

A transistor level schematic of an exemplary $C^2MOS$ D-FF is shown in FIG. 20. The $C^2MOS$ based design is commonly used in standard cell state-of-the-art libraries and is constantly evaluated by researchers and in industry. The scheme is composed of four tri-state inverters (TSI) and two CMOS inverters. It is clear that in the Steady State, when the clk='0', the outputs of all elements (except $TSI_3$) are inverted from their inputs. For example, although $TSI_2$ is in the off state, its input $X=\overline{Q_{mb}}$. In the case of clk='1' the exception is $TSI_1$. This means that the only elements that depend on the HD metric will be $TSI_3$ and $TSI_2$, when clk='0' and clk='1', respectively.

An example is now presented showing that the HD(D,Q) model (between the previous Q and the new data D) is better suited to capturing the leakage currents of this device. Starting with the case in which Clk='0' and the first latch is transparent with D='0', Qmb='1' and Q='1' (HD='1'). In this case, M1, M2 and M3 are cut off; however, M3 determines the leakage (dominated by subthreshold and DIBL currents) of TSI3, since its $V_{DS}=V_{DD}$. For the same case but with Q='0' (HD='0'), $V_{DS}$ of M3 equals '0' and its leakage current reduces exponentially. It can be shown that the HD model and the leakage currents highly correlate in a sequential device.

Figure 21A:
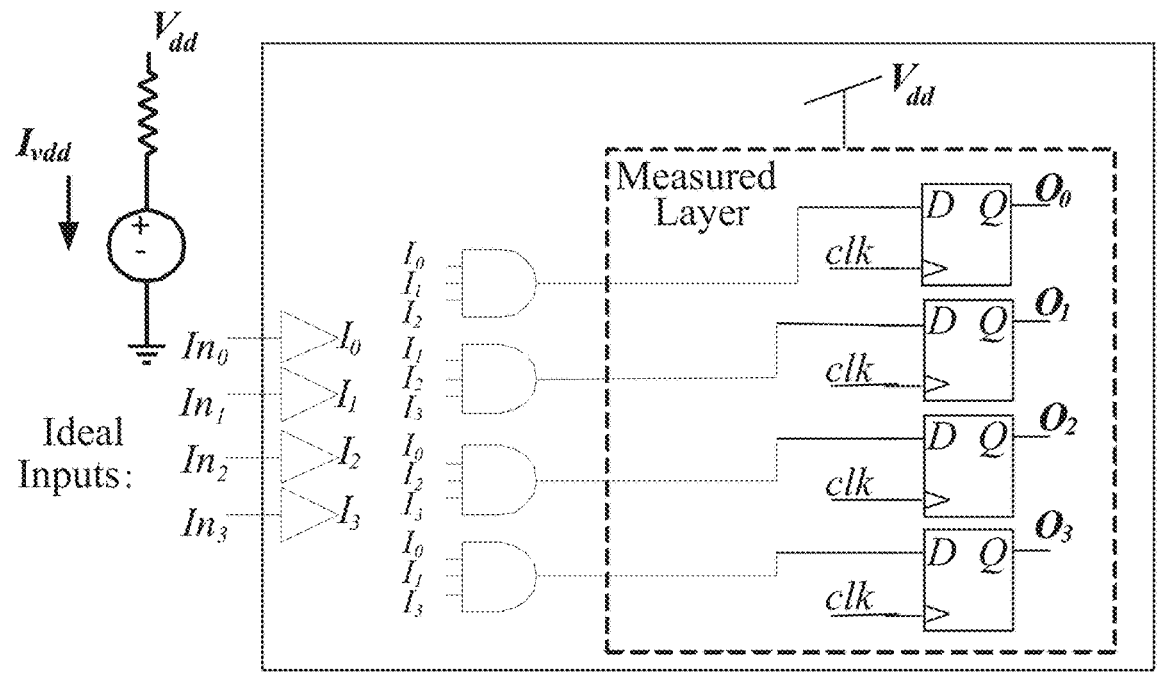
Figure 21B:
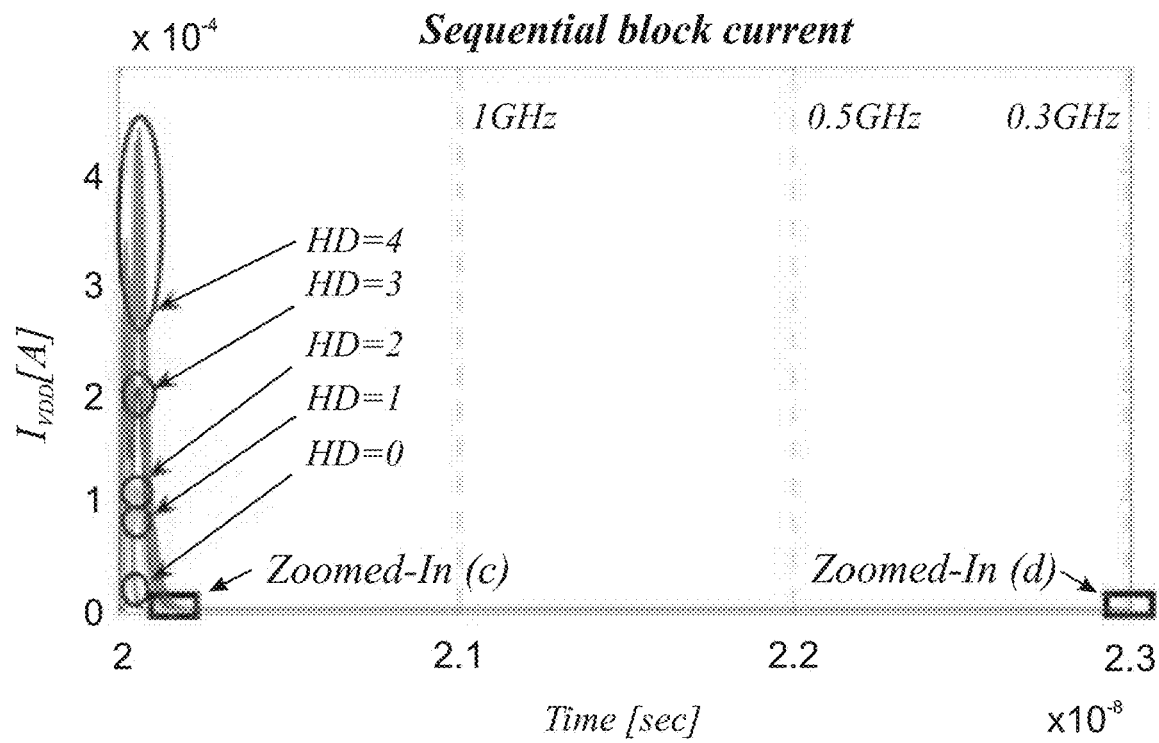
Figure 21C:
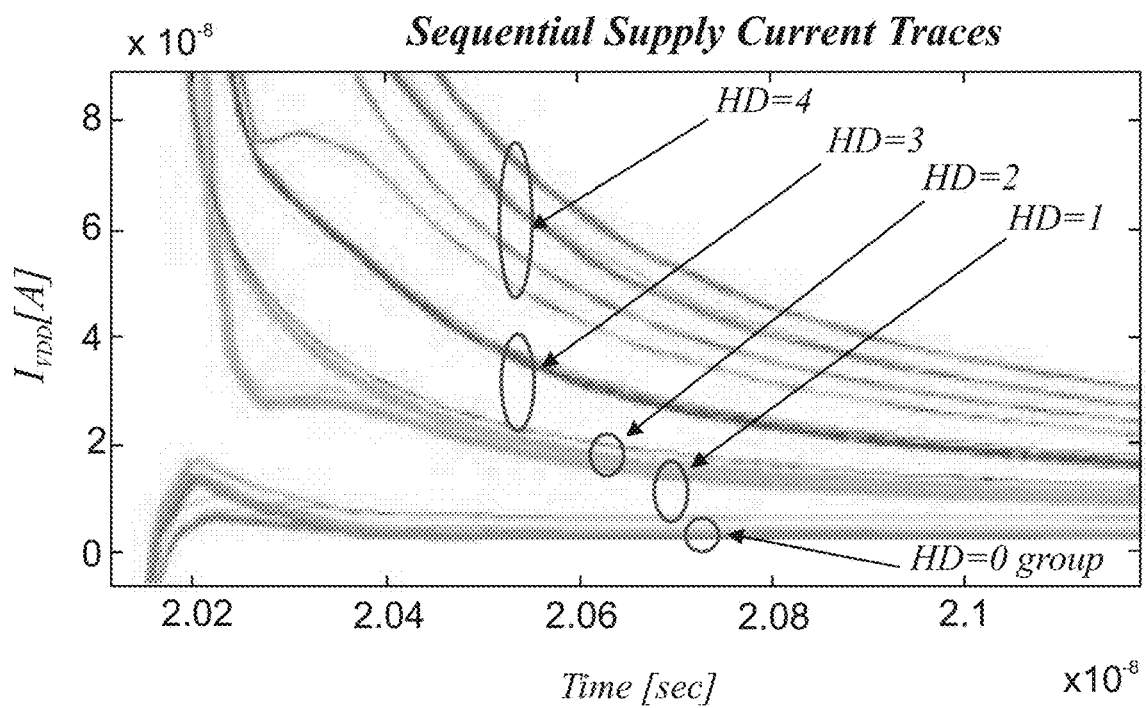
Figure 21D:
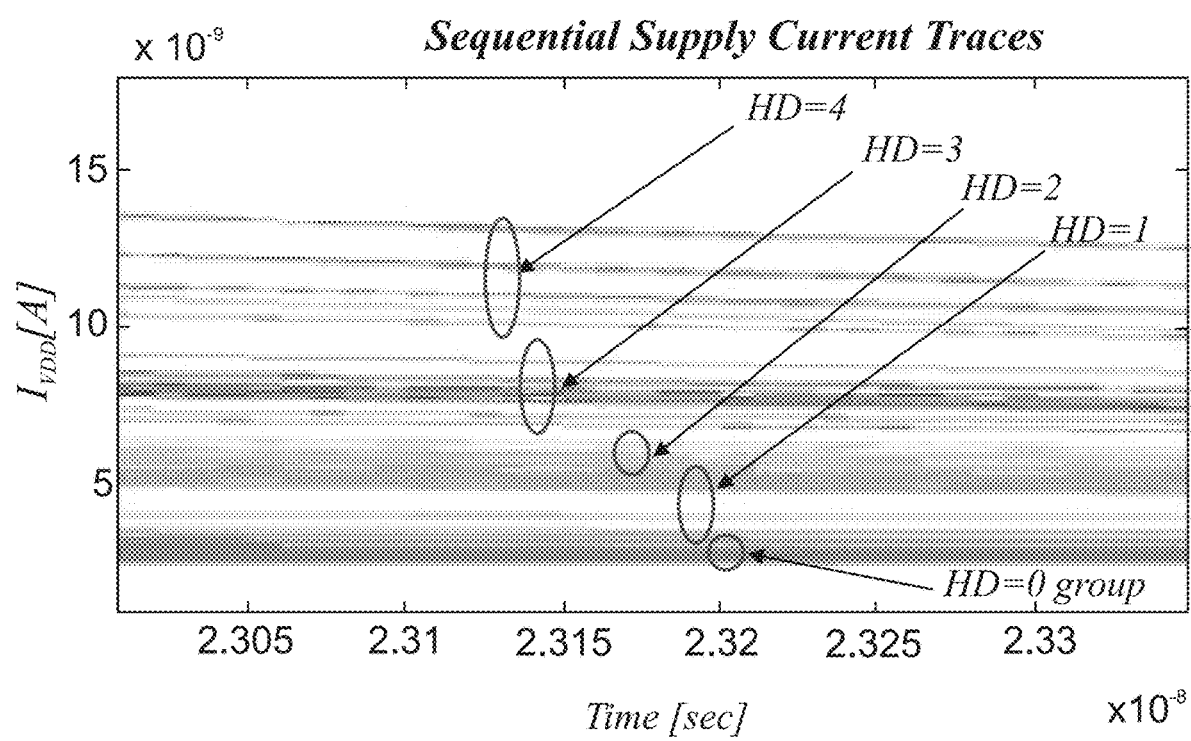

The above analysis is now illustrated and extended from a single sequential element to a group of four sequential elements taken from a standard cell 65 nm library. These elements are driven by a simple buffered layer of AND3 cells, as shown in FIG. 21A. The power supply of the sequential layer was measured while injecting randomly drawn input vectors. FIG. 21B shows the power supply current. It can be seen that the Active current rises monotonically with the HD. Zoomed-in versions of the end of the Active region (FIG. 21C) and the beginning of the Steady region (FIG. 21D) show that even at 23 ns (3 ns after the sampling time) the current does not truly stabilize. For example, multiple HD=4 currents are present in FIG. 21D while, clearly, in a true Steady state (after an infinite time) the group will stabilize on one specific value. Therefore, the system has memory and in practice a true Steady state is achieved after several to tens of thousands of micro-seconds. Nevertheless, different HD groups have a different mean leakage value as discussed above, even in this quasi-steady state. Furthermore, note that as the HD value increases, the variation in the quasi-steady state values increases.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A logic element comprising:
   a logic block, adapted to implement a logic function on input data to obtain a plurality output data signals, said output data signals being sampled by respective clock signals;
   a clock generator, adapted to generate a plurality of phase-shifted clock signals from a reference clock signal;
   a clock assigner associated with said logic block and said clock generator, adapted to assign differing ones of said phase-shifted clock signals to respective output data signals; and
   at least one sampling element associated with said logic block, said clock assigner and said clock generator, adapted to sample said output data signals in accordance with said respective assigned phase-shifted clock signals.

2. The logic element according to claim 1, wherein said clock assigner is adapted to assign said respective phase-shifted clock signals in accordance with functions of said input data.

3. The logic element according to claim 1, wherein said clock assigner is adapted to assign said respective phase-shifted clock signals in accordance with signals at internal nodes of said logic block.

4. The logic element according to claim 1, wherein said clock assigner is adapted to assign said respective phase-shifted clock signals by selecting one of a set of permutations of said phase-shifted clock signals in accordance with functions of said input data.

5. The logic element according to claim 1, wherein said clock assigner is adapted to assign said respective phase-shifted clock signals in accordance with random input to said clock assigner.

6. The logic element according to claim 1, wherein said clock assigner is adapted to assign said respective phase-shifted clock signals by randomly selecting one of a set of permutations of said phase-shifted clock signals.

7. The logic element according to claim 1, further comprising a delay element adapted to provide said reference clock signal by delaying a logic circuit global clock signal.

8. The logic element according to claim 1, wherein said logic block comprises combinational logic circuitry.

9. The logic element according to claim 1, wherein said logic element comprises sequential logic circuitry.

10. A method, comprising:
    implementing, by a logic block comprising a plurality of logic gates, a logic function on input data to obtain a plurality of output data signals:
    generating a plurality of phase-shifted clock signals from a reference clock signal;
    assigning respective ones of said phase-shifted clock signals to said output data signals by selecting one of a set of permutations of said phase-shifted clock signals in accordance with data input into said logic block; and
    sampling said output data signals with said respective assigned clock signals.

11. The according to claim 10, wherein said respective phase-shifted clock signals are assigned in accordance with functions of said input data.

12. The method according to claim 10, further comprising generating said reference clock signal by delaying a logic circuit global clock signal.

13. A method, comprising:
    implementing, by a logic block comprising a plurality of logic gates, a logic function on input data to obtain a plurality of output data signals:
    generating a plurality of phase-shifted clock signals from a reference clock signal;
    assigning respective ones of said phase-shifted clock signals to said output data signals in accordance with at least one random input; and
    sampling said output data signals with said respective assigned clock signals.

14. The method according to claim 13, wherein said respective phase-shifted clock signals are assigned in accordance with functions of said input data.

15. The method according to claim 13, further comprising generating said reference clock signal by delaying a logic circuit global clock signal.

16. The method according to claim 15, wherein said respective phase-shifted clock signals are assigned in accordance with functions of said input data.

17. The method according to claim 15, further comprising generating said reference clock signal by delaying a logic circuit global clock signal.

18. A method, comprising:
    implementing, by a logic block comprising a plurality of logic gates, a logic function on input data to obtain a plurality of output data signals:
    generating a plurality of phase-shifted clock signals from a reference clock signal;
    assigning respective ones of said phase-shifted clock signals to said output data signals by randomly selecting one of a set of permutations of said phase-shifted clock signals; and
    sampling said output data signals with said respective assigned clock signals.

* * * * *